(12) United States Patent
Lucas et al.

(10) Patent No.: US 7,487,850 B2
(45) Date of Patent: Feb. 10, 2009

(54) CHILDREN'S RIDE-ON VEHICLES HAVING IMPROVED SHIFTER ASSEMBLIES

(75) Inventors: Christopher F. Lucas, Cheektowaga, NY (US); John Rhein, Hamburg, NY (US)

(73) Assignee: Mattel, Inc., El Segundo, CA (US)

( * ) Notice: Subject to any disclaimer, the term of this patent is extended or adjusted under 35 U.S.C. 154(b) by 363 days.

(21) Appl. No.: 11/410,568

(22) Filed: Apr. 24, 2006

(65) Prior Publication Data

US 2007/0246271 A1    Oct. 25, 2007

(51) Int. Cl.
*G05G 9/00* (2006.01)

(52) U.S. Cl. .................... 180/65.1; 74/471 R
(58) Field of Classification Search ............... 180/65.1, 180/65.6, 65.8, 167, 169, 908; 74/469, 471 R, 74/473.1, 473.21, 473.28, 471 XY; 200/61.88, 200/61.85

See application file for complete search history.

(56) References Cited

U.S. PATENT DOCUMENTS

| | | | |
|---|---|---|---|
| 3,030,459 A | 4/1962 | Elliott et al. | |
| 3,639,705 A | 2/1972 | Rayner | |
| 3,674,046 A | 7/1972 | Miceli | |
| 4,052,578 A | 10/1977 | Hoke | |
| 4,284,157 A | 8/1981 | Lay | |
| 4,378,855 A | 4/1983 | Haub et al. | |
| 4,401,866 A | 8/1983 | Kaminski et al. | |
| 4,519,266 A * | 5/1985 | Reinecke | 74/471 XY |
| 4,531,027 A | 7/1985 | Vogt et al. | |
| 4,553,947 A | 11/1985 | Weiland et al. | |
| 4,560,022 A | 12/1985 | Kassai | |
| 4,562,893 A | 1/1986 | Cunard | |
| 4,565,538 A | 1/1986 | Kennedy et al. | |
| 4,643,695 A | 2/1987 | Kennedy et al. | |
| 4,716,980 A | 1/1988 | Butler | |
| 4,736,648 A | 4/1988 | Perego | |
| 4,823,632 A | 4/1989 | Harrod et al. | |
| 5,173,591 A | 12/1992 | Perego | |
| 5,175,062 A | 12/1992 | Farooque et al. | |

(Continued)

OTHER PUBLICATIONS

International Search Report, Sep. 10, 2008, 2 pages, U.S. Patent and Trademark Office.

(Continued)

*Primary Examiner*—Christopher P Ellis
*Assistant Examiner*—Vaughn T Coolman
(74) *Attorney, Agent, or Firm*—Kolisch Hartwell, P.C.

(57) ABSTRACT

Children's ride-on vehicles having improved shifter assemblies. The vehicles include a drive assembly comprising a velocity control assembly that selectively configures the drive assembly within a plurality of drive configurations and which includes a switch assembly adapted to be selectively configured between a plurality of velocity settings. Each velocity setting configures the drive assembly to a predetermined drive configuration. The velocity control assembly may include an actuator assembly that receives user inputs via a shifter handle moveable between a plurality of shift positions along a plurality of shift paths. Each shift position configures the switch assembly to a particular velocity setting. At least two of the shift paths have non-linear relative orientations. In some embodiments, the actuator assembly includes a biasing mechanism, which urges the shifter handle towards a selected shift position, and/or a restraining mechanism, which selectively prevents the shifter handle from being moved to a selected shift position.

38 Claims, 10 Drawing Sheets

U.S. PATENT DOCUMENTS

| | | | |
|---|---|---|---|
| 5,197,344 A | 3/1993 | Maier et al. | |
| 5,388,477 A | 2/1995 | Frei et al. | |
| 5,571,999 A * | 11/1996 | Harris | 200/565 |
| 5,644,114 A | 7/1997 | Neaves | |
| 5,742,014 A | 4/1998 | Schwartz et al. | |
| 5,934,694 A | 8/1999 | Schugt et al. | |
| 6,082,213 A * | 7/2000 | Skogward | 74/473.18 |
| 6,422,330 B1 | 7/2002 | Harris | |
| 6,470,982 B2 | 10/2002 | Sitarski et al. | |
| 6,718,842 B1 * | 4/2004 | Bofias | 74/473.33 |
| 6,719,076 B1 | 4/2004 | Tabata et al. | |
| 6,756,750 B2 | 6/2004 | Wakitani et al. | |
| 6,771,034 B2 | 8/2004 | Reile et al. | |
| 6,789,444 B2 * | 9/2004 | Fujiwara et al. | 74/473.23 |
| 6,921,870 B2 | 7/2005 | Lan et al. | |
| 7,213,483 B2 * | 5/2007 | Inoguchi et al. | 74/473.23 |
| 2002/0121395 A1 | 9/2002 | Norman et al. | |
| 2004/0069557 A1 | 4/2004 | Lan et al. | |
| 2004/0154854 A1 | 8/2004 | Stephens | |

OTHER PUBLICATIONS

Written Opinion, Sep. 10, 2008, 5 pages, U.S. Patent and Trademark Office.

* cited by examiner

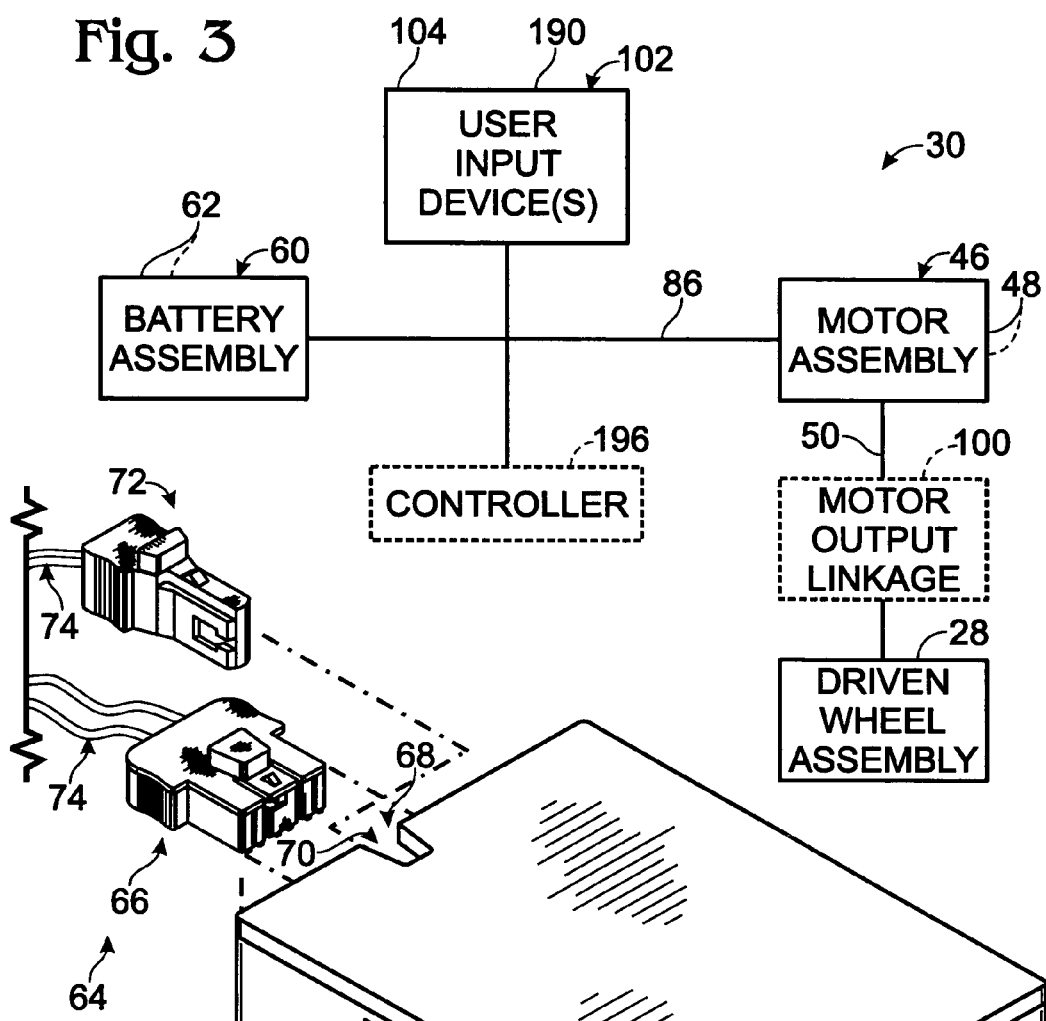
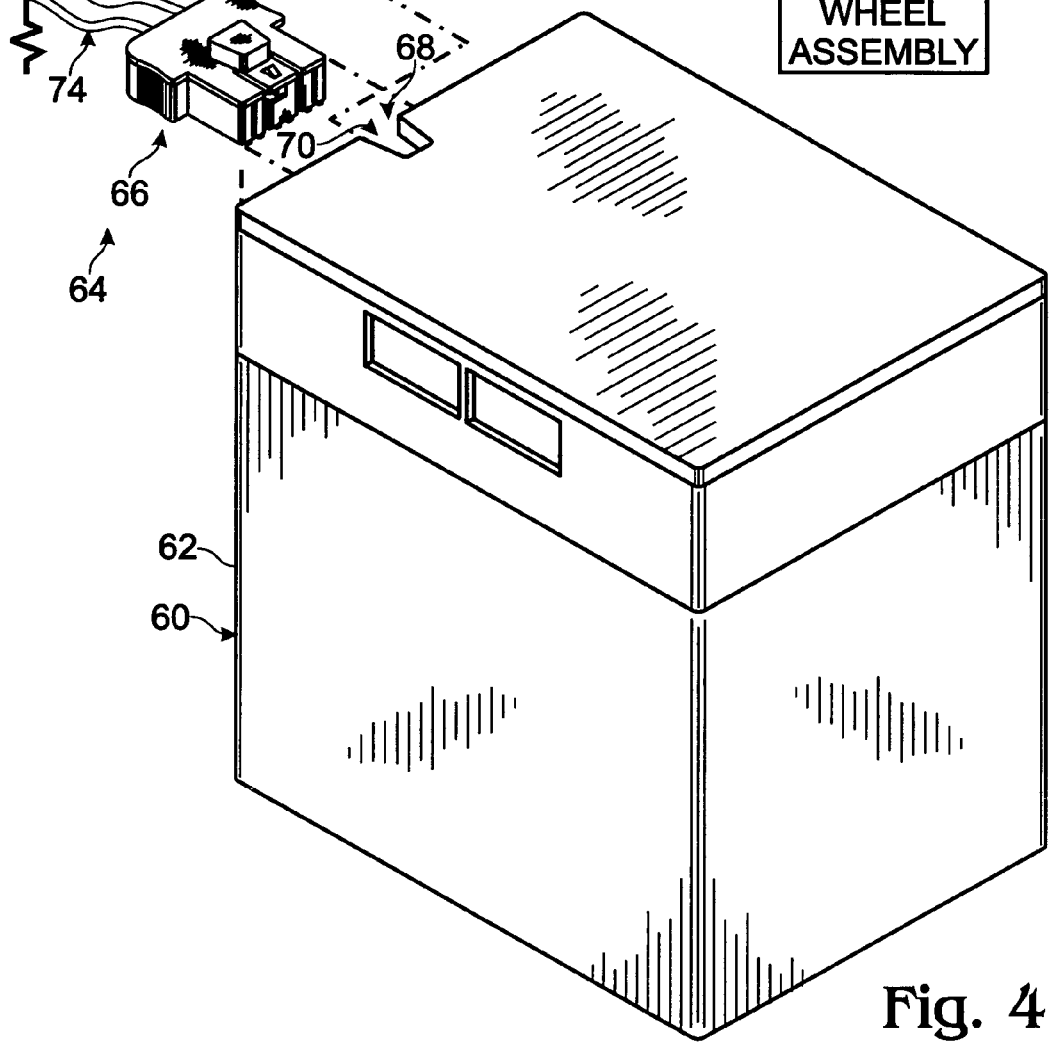

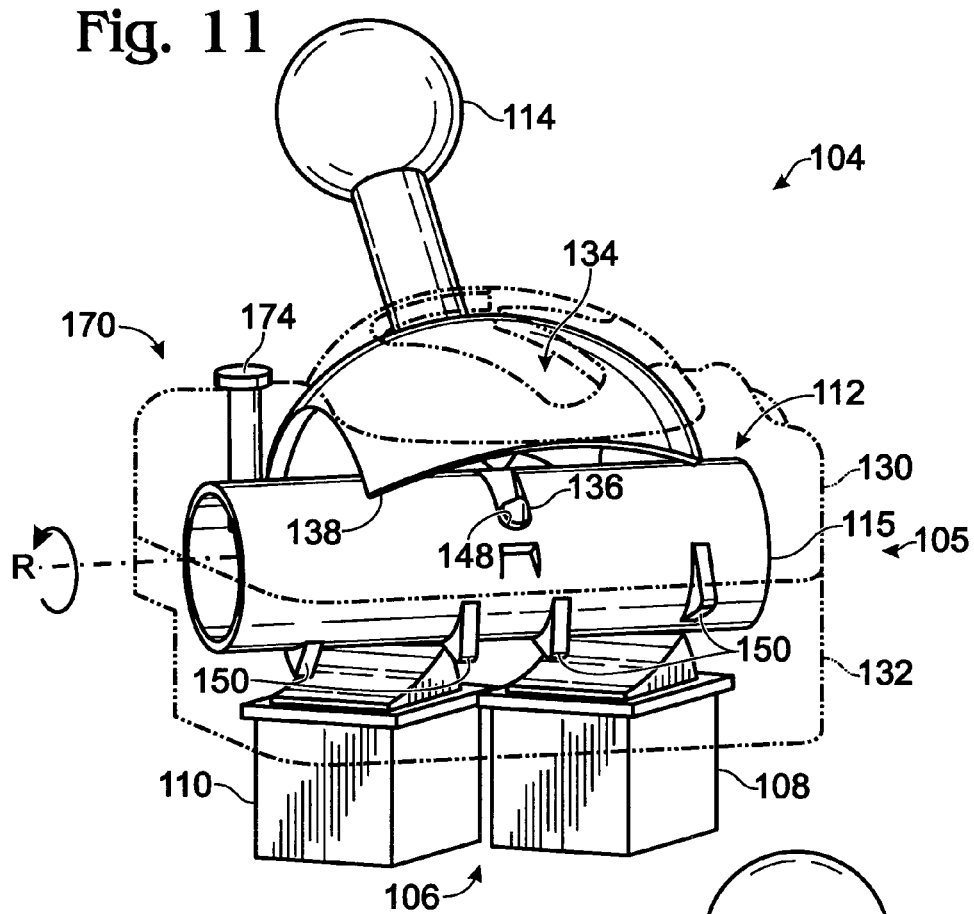

Fig. 13
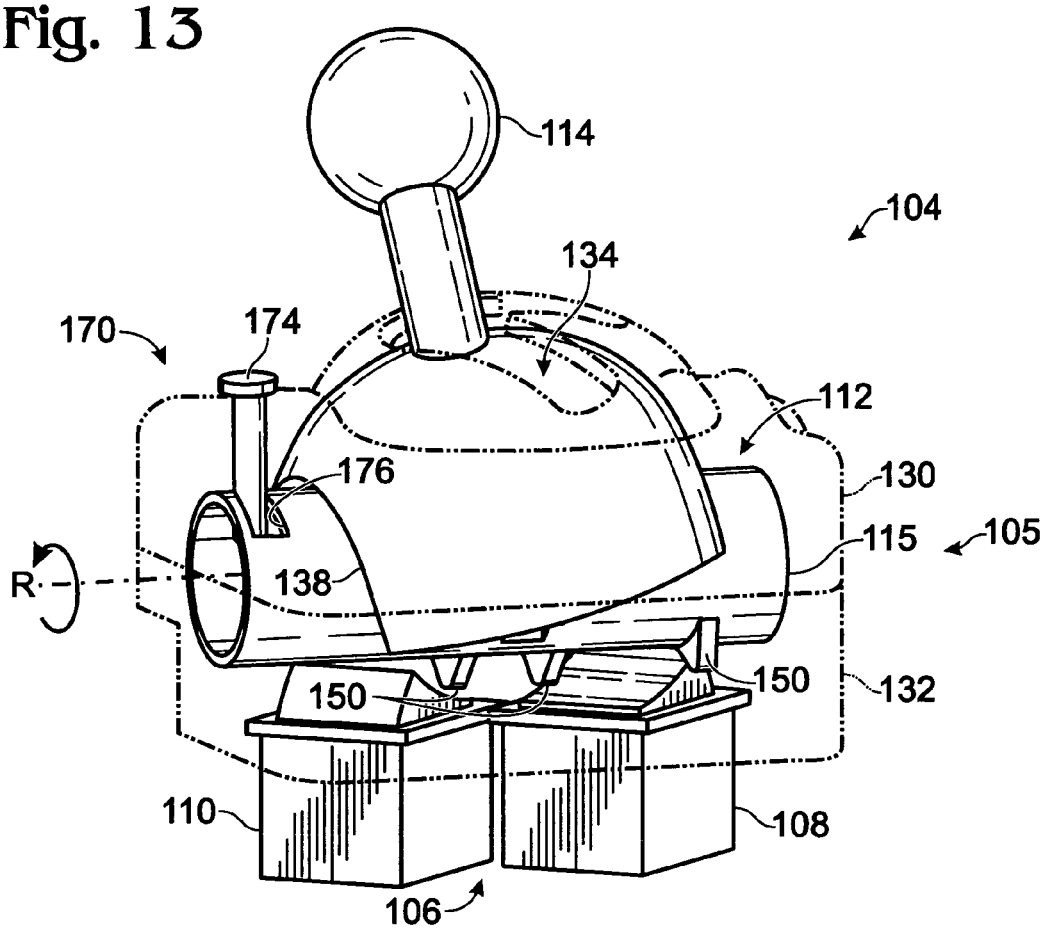
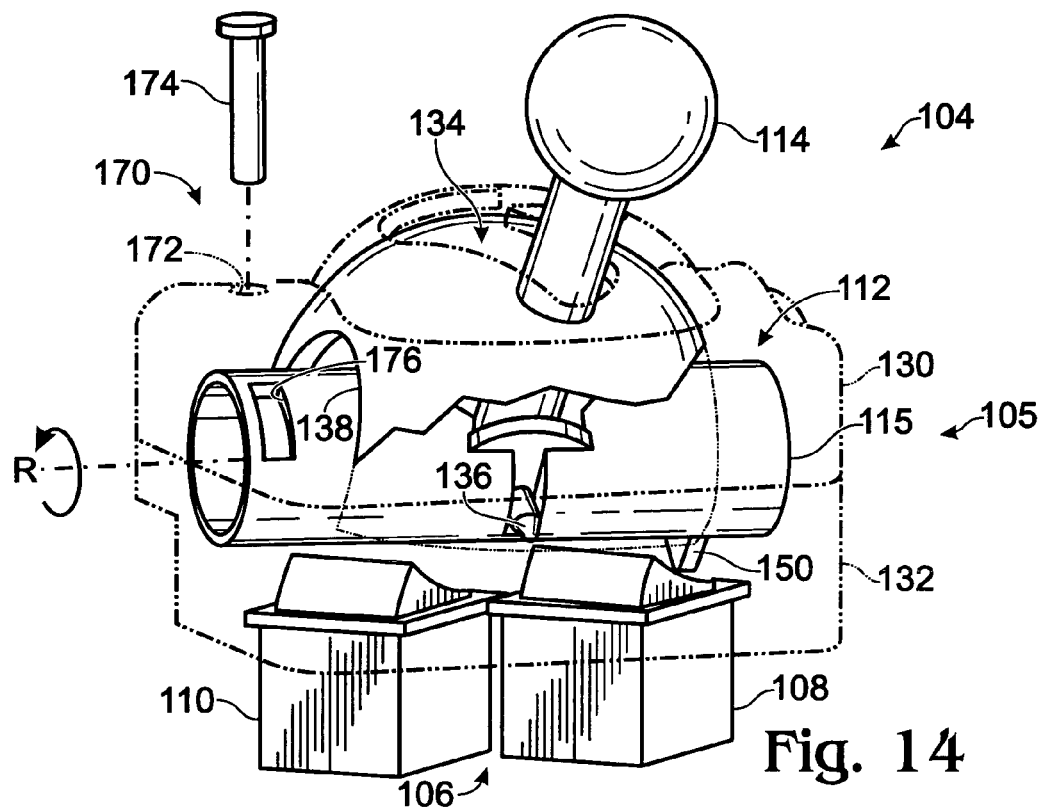
Fig. 14 ated with an actuator assembly of
CHILDREN'S RIDE-ON VEHICLES HAVING IMPROVED SHIFTER ASSEMBLIES

TECHNICAL FIELD

The present disclosure relates generally to children's ride-on vehicles, and more particularly to battery-powered children's ride-on vehicles and drive assemblies for use with such vehicles.

BACKGROUND OF THE DISCLOSURE

Children's ride-on vehicles are reduced-scaled vehicles that are designed for use by children. For example, children's ride-on vehicles include a seat adapted to accommodate one or more children and steering and drive assemblies that are adapted to be operated by a child sitting on the seat. One type of drive assembly that is often used in children's ride-on vehicles includes a battery-powered motor assembly that is adapted to drive the rotation of one or more of the vehicle's wheels. Typically, the vehicle will include an actuator, such as a foot pedal, push button or other user input device, which enables a child to select when power is delivered to the motor assembly. Some drive assemblies further include other user input devices, which are operated by a child sitting on the vehicle's seat to select the speed and/or direction at which the vehicle travels.

BRIEF DESCRIPTION OF THE DRAWINGS

FIG. 3 is a schematic diagram of a suitable drive assembly for a children's ride-on vehicle, such as the vehicle of FIG. 1.

FIG. 4 is an isometric view of an illustrative battery assembly with portions of the vehicle's wiring harness and a charger shown in fragmentary.

FIG. 11 is an isometric view of the velocity control assembly from FIG. 10, with the shifter handle in a first position and portions of the velocity control assembly shown in phantom.

FIG. 12 is an isometric view of the velocity control assembly from FIG. 10, with the shifter handle in a second position and portions of the velocity control assembly shown in phantom.

FIG. 13 is an isometric view of the velocity control assembly from FIG. 10, with the shifter handle in a third position and portions of the velocity control assembly shown in phantom.

FIG. 14 is an isometric view of the velocity control assembly from FIG. 10, with the shifter handle in a fourth position and portions of the velocity control assembly shown in phantom.

DETAILED DESCRIPTION AND BEST MODE OF THE DISCLOSURE

Figure 1:
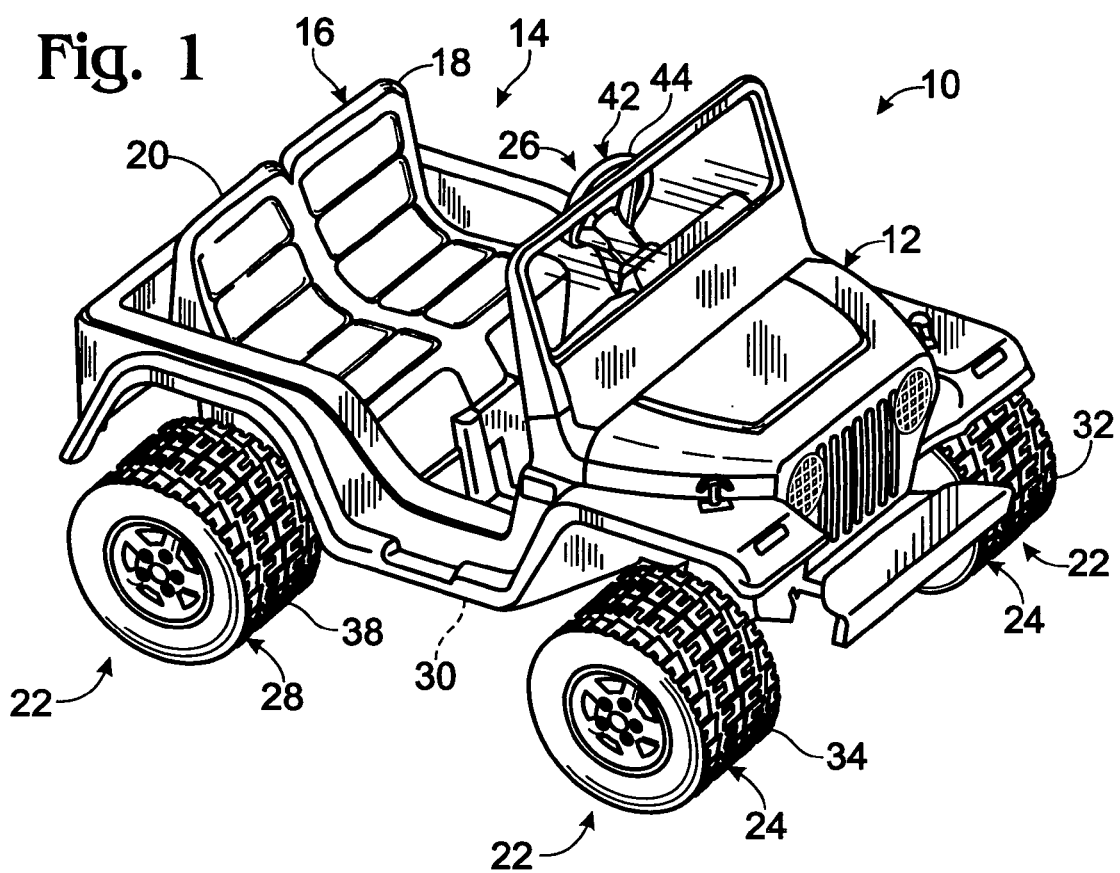
FIG. 1 is an isometric view of an illustrative example of a children's ride-on vehicle.

An illustrative example of a children's ride-on vehicle is shown in FIG. 1 and indicated generally at 10. Ride-on vehicle 10 includes a support frame, or body, 12 that provides a riding space, or passenger compartment, 14 with a seat assembly 16 that is sized and configured to accommodate at least one child, including a child driver. Seat assembly 16 may be integral with or otherwise mounted on body 12 and may have any suitable configuration, including configurations in which the position of seat assembly 16 is adjustable within the passenger compartment, and configurations in which seat assembly 16 includes two or more seats or two or more seating regions. Typically, vehicle 10 will be sized for use by a child driver or by a child driver and a child passenger. For example, in the illustrated embodiment, seat assembly 16 includes a pair of seats, or seating regions, 18 and 20, with seat 18 sized and positioned to receive a child driver and seat 20 sized and positioned to receive a child passenger.

Body 12 typically is formed from molded plastic and may be integrally formed or formed from a plurality of parts that are secured together by screws, bolts, clips or other suitable fasteners. Body 12 may additionally, or alternatively, be at least partially formed from other suitable material(s), such as metal, wood, or composite materials. Body 12 may include an underlying frame on which a chassis is mounted. In such an embodiment, the frame is often formed of metal and/or molded plastic, with the chassis typically formed of molded plastic.

As shown, body 12 is shaped to generally resemble a reduced-scale Jeep® vehicle. JEEP is a registered trademark of the Diamler Chrysler Corporation, and the JEEP mark and designs are used by permission. Children's ride-on vehicles according to the present disclosure may be shaped to generally resemble any type of vehicle. Examples of suitable vehicles are reduced-scale, or child-sized, vehicles that are shaped to resemble corresponding full-sized, or adult-sized, vehicles, such as cars, trucks, construction vehicles, emergency vehicles, off-road vehicles, motorcycles, space vehicles, aircraft, watercraft and the like. However, it is also within the scope of the present disclosure that vehicle 10 may be shaped to resemble fantasy vehicles that do not have a corresponding adult-sized counterpart. Although vehicle 10 is depicted in the form of a reduced-scale Jeep® vehicle, it will be appreciated that the components and/or features of vehicle 10 may be configured for use on any type of children's ride-on vehicle having one or more powered components.

Figure 2:
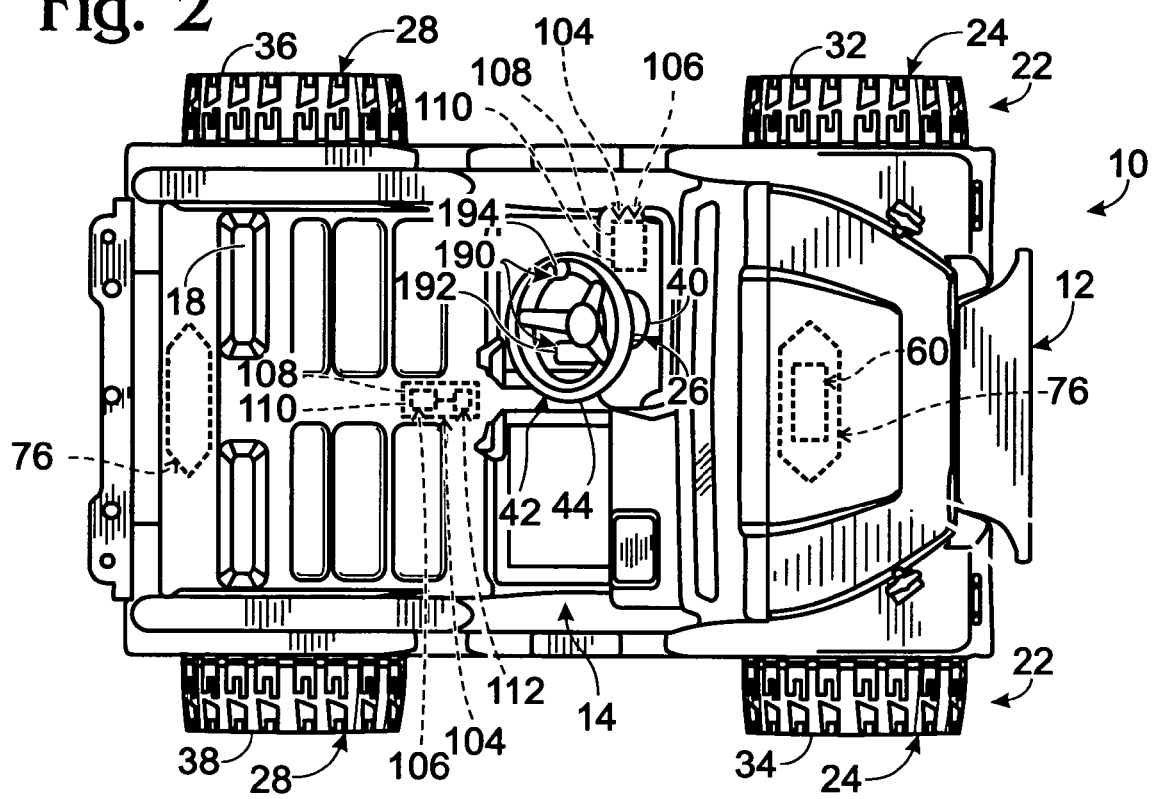
FIG. 2 is a top plan view of the children's ride-on vehicle of FIG. 1.

Body 12 also includes a plurality of wheels 22 that are rotatably coupled to body 12, as indicated in FIGS. 1-2. The plurality of wheels 22 includes a steerable wheel assembly 24 that contains at least one steerable wheel that is adapted to be steered by the vehicle's steering assembly 26, typically at least partially in response to user-imparted steering inputs thereto. The plurality of wheels further includes a driven wheel assembly 28 that contains at least one driven wheel that is adapted to be rotationally driven by the vehicle's drive assembly 30. As used herein, the term "driven wheel" refers to a wheel that is rotated directly in response to a rotational input from the vehicle's drive assembly, which is either directly conveyed to the wheel by the output of the motor assembly or conveyed through a linkage, such as a gearbox, belt, chain, gear assembly, axle, or the like. In the illustrated embodiment, vehicle 10 includes four wheels 22, with front wheels 32 and 34 forming steerable wheel assembly 24, and rear wheels 36 and 38 forming driven wheel assembly 28. The number of wheels on the vehicle may vary from two wheels to four, six or more wheels, although children's ride-on vehicles typically include at least three wheels for stability. Similarly, each wheel assembly must contain at least one wheel, and a particular wheel may form all or a portion of both the steerable wheel assembly and the driven wheel assembly. For example, it is within the scope of the disclosure that either or both of front wheels 32 and 34 or rear wheels 36 and 38 are driven and steerable. Similarly, one front wheel and one rear wheel may be driven and/or steerable, or the vehicle may include one or more driven or steerable wheels underneath its body that are generally hidden by the body of the vehicle.

A portion of the vehicle's steering assembly 26 is shown in FIGS. 1 and 2, and includes a steering column 40 (indicated in FIG. 2) and a steering mechanism 42. The steering assembly enables a child sitting on seat 18 to steer the vehicle's steerable wheel assembly 24 via user-applied steering inputs to steering mechanism 42, which is positioned on vehicle 10 for operation by a child sitting on seat 18. In the illustrated embodiment, steering mechanism 42 takes the form of a steering wheel 44. Other suitable structures, such as handlebars and steering levers may be used and are within the scope of the present disclosure. Steering column 40 includes any suitable mechanical linkage that conveys a child's steering inputs from the steering mechanism to the vehicle's steerable wheel assembly, thereby steering the vehicle.

FIG. 3 schematically illustrates an example of a suitable drive assembly 30 for a children's ride-on vehicle, such as vehicle 10. Drive assembly 30 may include a motor assembly 46 adapted to selectively drive the rotation of the driven wheel assembly 28, a battery assembly 60 adapted to selectively energize the motor assembly, and one or more user input devices 102 adapted to receive user input signals that may (1) selectively configure the drive assembly within a plurality of drive configurations and/or (2) selectively direct, or cause, the drive assembly to operate in a selected drive configuration.

The motor assembly 46 includes at least one electric motor 48 that is adapted to drive the rotation of at least one of the plurality of wheels. The motor assembly includes an output 50 that provides a rotational input to the driven wheel assembly. Typically, the output 50 from each of the one or more motors includes a rotating shaft and/or a rotation pinion or output gear. Output 50 may include more than one shaft, pinion, and/or gear, such as when motor assembly 46 includes more than one motor and/or when driven wheel assembly 28 includes more than one driven wheel. Motor assembly 46 may also be configured to power other moveable components on vehicle 10, such as depending on the form of the vehicle. For example, the motor assembly may be coupled to raise and lower the blade of a ride-on that resembles a bulldozer, the bucket of a ride-on that resembles a skid-steer or other loader, the bed of a ride-on that resembles a dump truck, etc.

Power for the motor assembly is provided by any suitable power source. An illustrative example of a suitable power source is a battery assembly 60. Battery assembly 60 includes at least one battery 62 that is adapted to provide power to the motor assembly. Any suitable type and number of batteries may be used in battery assembly 60. Although not required, the batteries are typically rechargeable batteries. For example, one or more six-, twelve-, eighteen-, or twenty-four-volt batteries have proven effective. An illustrative example of a battery assembly 60 is shown in FIG. 4. Also shown in FIG. 4 is a connector assembly 64 to transmit power from the battery assembly to the motor assembly 46. Thus, motor assembly 46 is operably connected to battery assembly 60 by any suitable electrical connectors, such as cables, wires, or positive and negative terminals or leads, and the like. In the exemplary battery assembly 60 shown generally in FIG. 4, the connector assembly includes a plug 66 that fits into a socket 68 that is electrically connected to the battery assembly. The battery assembly 60 may optionally include a charging jack 70 that is configured to receive a charging probe 72. The plug and probe connect to wires, or electrical cables, 74 that transmit electrical power from the battery assembly to the motor assembly. It is within the scope of the present disclosure that vehicle 10 may include any other suitable structure for conducting electrical power from battery assembly 60 to motor assembly 46, with the battery assembly of FIG. 4 merely providing an illustrative example. For example, it is within the scope of the present disclosure that battery assembly 60 may include an electrical connector, such as a plug or socket, that extends from the housing of the battery assembly and is electrically connected thereto by lengths of wires.

As shown in FIG. 2, body 12 also may include a battery compartment 76 that is adapted to receive battery assembly 60. Battery compartment 76 may take any of a variety of different shapes, sizes, and configurations depending on such factors as the form of vehicle 10, the portion of the vehicle's body within which the compartment is formed, the size and shape of battery assembly 60, etc. FIG. 2 provides graphical illustrations of several suitable, non-exclusive positions for battery compartment 76.

In FIG. 3, drive assembly 30 is shown further including an optional motor output linkage 100 that mechanically interconnects the motor assembly with the driven wheel assembly. Motor output linkage 100 is any suitable mechanism that transmits the rotational input from the motor assembly's output(s) to the driven wheel assembly. Examples of suitable linkages 100 include an intermediate linkage between the output and the driven wheel assembly, such as a gearbox containing one or more gears, a belt or chain drive, a worm gear, one or more individual gears, and the like. The motor output linkage may be adapted to transmit the rotational input from the motor assembly to the driven wheel assembly at the same relative rate of rotation, or it may mechanically augment the rotational input to convey a greater or lesser rate of rotation relative to the rate of rotation of the output of the motor assembly. It is also within the scope of the disclosure that drive assembly 30 may be formed without motor output linkage 100, in which case the output(s) 50 of the motor assembly directly transmit the rotational input to the driven wheel assembly.

The one or more user input devices 102, or control devices, are adapted to convey inputs from a child sitting on seat 18 to the drive assembly. Generally, user input devices 102 convey the user inputs to battery assembly 60, motor assembly 46 and/or controller 196 (described below) via the vehicle's wiring harness 86. User input devices 102 may thereby be used (1) to selectively configure the drive assembly within a plurality of drive configurations and/or (2) to selectively direct, or cause, the drive assembly to operate in a selected drive configuration.

An illustrative example of a suitable user input device 102 includes a velocity control assembly 104, which receives user input(s) that selectively configure the drive assembly to be in one of the plurality of drive configurations. Each drive configuration defines a relative rate of rotation, and/or direction of rotation, of the motor assembly 46. As shown in FIG. 2, the velocity control assembly 104 may be positioned anywhere adjacent to seat 18 so as to enable a child sitting in seat 18 to provide user input(s) to velocity control assembly 104.

Figure 5:
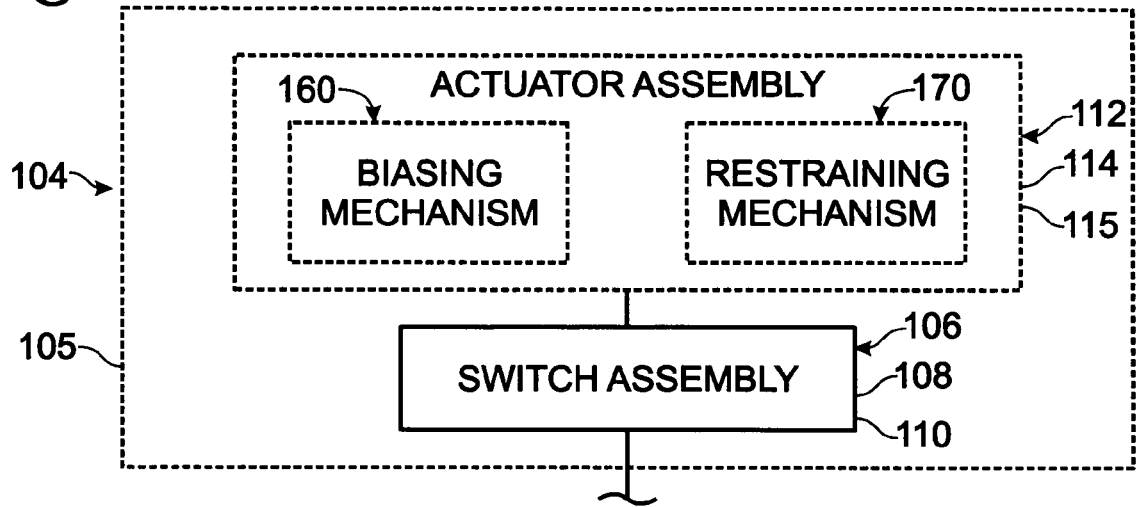
FIG. 5 is a schematic diagram of a suitable velocity control assembly for a children's ride-on vehicle, such as the vehicle of FIG. 1.

FIG. 5 schematically shows an illustrative example of a velocity control assembly 104. Velocity control assembly 104 may (but is not required to) include a housing assembly 105. Housing assembly 105 includes one or more components associated with the ride-on vehicle's body 12 that are adapted to secure, house and/or maintain the other components of the velocity control assembly. Housing assembly 105 may be integral with the vehicle's body 12, may be a separate unit that is removably securable to the vehicle's body 12, and/or may include both integral and separately formed components. Housing assembly 105 may be positioned to enable a user sitting in seat 18 to provide user input(s) that are received by velocity control assembly 104.

As shown in FIG. 5, velocity control assembly 104 comprises a switch assembly 106, which includes any assembly having at least one switch that is adapted to be selectively configured between a plurality of velocity settings. Each velocity setting may in turn configure the drive assembly to be in a predetermined drive configuration, some or all of which may be non-neutral drive configurations. The overall configuration of the various switch(es) included in the switch assembly determines the switch assembly's velocity setting. The velocity setting in turn configures the drive assembly to be in a predetermined drive configuration, as briefly described above.

As an illustrative, non-exclusive example, switch assembly 106 may include a speed switch 108 and/or a direction switch 110. Speed switch 108 enables a user to select the relative rate of rotation of the motor assembly's output 50 (shown in FIG. 3) by selectively configuring the drive assembly between various low speed and high speed drive configurations. An illustrative example of a suitable speed switch 108 is a switch that selectively configures a pair of batteries between series and parallel configurations to define relative "low" speed and "high" speed drive configurations. As another example, speed switch 108 may additionally or alternatively selectively configure a pair of motors between series and parallel configurations. Direction switch 110 enables a user to select the direction (i.e., clockwise or counterclockwise) of rotation of output 50 by configuring the drive assembly to be in either a forward or a reverse drive configuration. As a further illustrative example, when the drive assembly includes, or is in communication with, a microprocessor or other suitable controller, the controller may respond to inputs from the switches of the switch assembly to control activation of the motor assembly by the battery assembly to achieve the selected drive configuration.

Switch assembly 106 may have various structural configurations. Each of the switch assembly's switches may include a rocker switch, a pushbutton switch, a contact switch, or any other type of suitable switch. Switch assembly 106 may be located in any suitable location on body 12 or steering assembly 26 for actuation by a child sitting on seat 18. For example, switch assembly 106 may directly receive user inputs from the child. Alternatively or additionally, switch assembly 106 may be indirectly configured by an actuator assembly 112 that directly receives user inputs from a child sitting on seat 18, as described below. Switch assembly 106 may convey the user inputs to a controller, such as subsequently described controller 196, which, responsive to inputs from the switches, configures the drive assembly to be in a selected drive configuration.

Velocity control assembly 104 may (but is not required to) include an actuator assembly 112 in addition to switch assembly 106. Actuator assembly 112 includes any assembly that is adapted to receive user inputs from the child sitting on seat 18, whereby actuator assembly 112 engages switch assembly 106, and configures switch assembly 106 to be in a corresponding velocity setting. Actuator assembly 112 may include a shifter handle 114 adapted to be selectively moved by the child between a plurality of positions along a plurality of shift paths. Shifter handle 114 may be similar to the shifter handle from a full-sized motorized vehicle, and may be movable between a first position and a second position along a first shift path, and a second and a third position along a second shift path, etc., as described in more detail below. Actuator assembly 112 may be adapted to configure switch assembly 106 to be in a particular, or predetermined, velocity setting for each shift position of shifter handle 114. Further, the velocity setting corresponding to one shift position may be the same as, or different than, the velocity setting corresponding to another shift position.

The actuator assembly 112 may include an actuator 115 operatively coupled to shifter handle 114, and adapted to selectively engage the switch assembly. As shifter handle 114 is moved between shift positions, actuator 115 may be moved by shifter handle 114 in a manner that causes actuator 115 to engage at least a portion of switch assembly 106, thereby reconfiguring the switch assembly to be in the predetermined velocity setting. In some actuator assemblies 112, actuator 115 may be coupled to shifter handle 114 in a manner such that some, but not all, movement of shifter handle 114 causes movement of actuator 115. Thus, movement of shifter handle 114 between certain shift positions, or along certain shift paths may not cause any movement of actuator 115, and therefore may not reconfigure switch assembly 106 to be in a different velocity setting.

Figure 6:
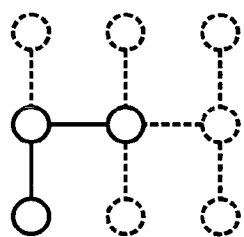
FIG. 6 is a schematic diagram showing illustrative shift positions and shift paths along which a child may move a shifter handle that is associated with an actuator assembly of a velocity control assembly of FIG. 5.
Figure 7:
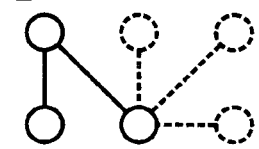
FIG. 7 is a schematic diagram showing illustrative shift positions and shift paths along which a child may move a shifter handle that is associated with an actuator assembly of a velocity control assembly of FIG. 5.
Figure 8:
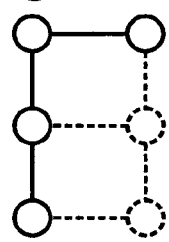
FIG. 8 is a schematic diagram showing illustrative shift positions and shift paths along which a child may move a shifter handle that is associated with an actuator assembly of a velocity control assembly of FIG. 5.

The actuator assembly 112 may have various structural configurations, such that shifter handle 114 may be moved along a wide variety of shift paths. FIGS. 6-8 each provide illustrative, non-exclusive examples of different possible configurations, where the circles generally indicate examples of shift positions, and the lines generally indicate examples of shift paths. Actuator assemblies adapted to utilize the illustrative, non-exclusive examples of shift paths and positions may be oriented in any suitable orientation relative to the ride-on's body and/or seat 18, including configurations that are mirror-images or inversions of the illustrative configurations shown in FIGS. 6-8. Some shift positions and shift paths are shown in phantom lines to indicate that the actuator assembly may have any number of shift positions and shift paths. Also as illustrated in FIGS. 6-8, the shift positions and shift paths may be arranged in virtually any conceivable manner, such as to resemble, or simulate, the shifter mechanisms of a manual or automatic transmission for a full-scale motorized vehicle. Some shift paths may be co-linear with other shift paths, while some shift paths may be at divergent angles from other shift paths. Multiple adjoining shift paths that are not co-linear with each other may be described as "aggravated" or "divergent" shift paths, which hinder a child's ability to rapidly move shifter handle 114 between the endmost shift positions along the aggravated shift path. Although the shift paths shown in FIGS. 6-8 are substantially linear, the present disclosure also encompasses non-linear shift paths.

Figure 9:
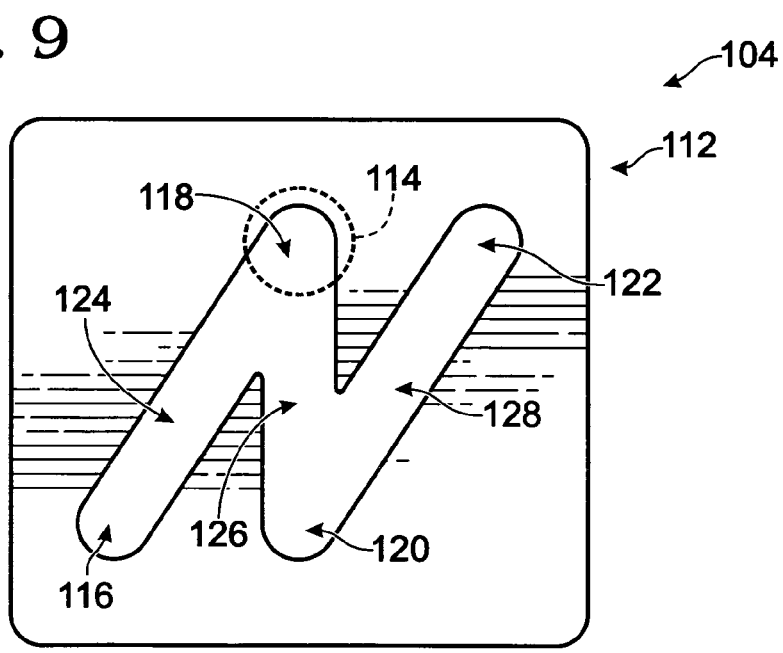
FIG. 9 is a top plan view of an illustrative velocity control assembly according to the present disclosure.

FIG. 9 shows a top-down view of an illustrative, non-exclusive example of an actuator assembly 112 that may be used with velocity control assemblies according to the present disclosure. The actuator assembly 112 shown in FIG. 9 includes four shift positions 116, 118, 120 and 122, each of which corresponds to a particular drive configuration. As described above, actuator assembly 112 is adapted to configure the switch assembly (not shown) to be in a particular velocity setting for each shift position. Moving shifter handle 114 between the four shift positions 116, 118, 120 and 122 may thus cause actuator assembly 112 to selectively engage the switch assembly's switches (not shown) in a manner that configures switch assembly 106 to be in up to four different velocity settings, such as one for each shift position. Also as described above, each velocity setting in turn configures the drive assembly to be in a predetermined drive configuration. Therefore, each shift position corresponds to a particular drive configuration. For example, shift position 116 may correspond to a low-speed reverse drive configuration, shift positions 118 and 120 may both correspond to a low-speed forward drive configuration, and shift position 122 may correspond to a high-speed forward drive configuration.

The actuator assembly 112 shown in FIG. 9 also includes three adjoining shift paths 124, 126 and 128. Because these shift paths are not co-linear with each other, the overall shift path formed by adjoining shift paths 124, 126 and 128 may be described as an "aggravated" shift path, as described above. For example, the overall shift paths formed by adjoining (1) shift paths 124 and 126, (2) shift paths 126 and 128, or (3) shift paths 124, 126 and 128, are each aggravated shift paths. As indicated above, providing an actuator assembly having an aggravated shift path hinders a child's ability to rapidly move the shifter handle between the endmost shift positions along the aggravated shift path. For example, the aggravated shift path formed by adjoining shift paths 124 and 126 hinders the child's ability to rapidly move shifter handle 114 between shift position 116 and shift position 120, because the child must change the direction of the forces applied to shifter handle 114 upon reaching shift position 118. Likewise, if the shifter handle 114 is in shift position 116, the aggravated shift path formed by adjoining shift paths 124, 126 and 128 hinders the child's ability to rapidly move shifter handle 114 to shift position 122, because the child must change the direction of the forces applied to shifter handle 114 upon reaching both shift position 118 and shift position 120.

Providing an actuator assembly 112 having an aggravated shift path may reduce the potential for damage to the drive assembly of the children's ride-on. As indicated above, each shift position corresponds to a particular drive configuration. For children's ride-on vehicles having both a reverse drive configuration, and a high-speed forward drive configuration, rapidly shifting between these drive configurations while the drive assembly is operating places substantial loads on the mechanical and/or electrical components of drive assembly 30. Because an actuator assembly 112 having an aggravated shift path between the reverse drive configuration and the high-speed forward drive configuration hinders the child's ability to rapidly shift between these drive configurations, the aggravated shift path may reduce the loads applied to the various components of drive assembly 30, such as compared to a similar drive assembly having only a linear shift path.

For example, referring to the top-down view of the actuator assembly 112 shown in FIG. 9, shift position 116 may correspond to a low-speed reverse drive configuration, shift positions 118 and 120 may both correspond to a low-speed forward drive configuration, and shift position 122 may correspond to a high-speed forward drive configuration. If shifter handle 114 is in shift position 116 (low-speed reverse), the aggravated shift path formed by adjoining shift paths 124, 126 and 128 hinders the child's ability to rapidly move shifter handle 114 to shift position 122 (high-speed forward). The aggravated shift path thus reduces the child's ability to place an unnecessary load on drive assembly 30, and prolongs the life of the children's ride-on vehicle.

As schematically illustrated in FIG. 5, the actuator assembly 112 may (but is not required in all embodiments to) further include a biasing mechanism 160 that urges the shifter handle towards a selected one of the shift positions. The biasing mechanism 160 may increase, at least in one direction, the time required for a child to move the shifter handle along at least one selected shift path by requiring the child to exert sufficient force upon the shifter handle 114 to overcome the bias imparted on the shifter handle by the biasing mechanism. The biasing mechanism may additionally or alternatively urge the shifter handle (or other suitable portion of the actuator assembly) toward a particular shift position or shift path. The shift position to which the biasing mechanism 160 urges the shifter handle may, as an illustrative, non-exclusive example, be selected so as to hinder the child's ability to rapidly move the shifter handle between shift positions corresponding to a low-speed reverse and a high-speed forward drive configuration. As with the aggravated shift paths, biasing mechanism 160 may thus be used to reduce the potential for damage to the drive assembly of the children's ride-on.

For example, referring to the top down view of the actuator assembly 112 shown in FIG. 9, shift position 116 may correspond to a low-speed reverse drive configuration, shift positions 118 and 120 may both correspond to a low-speed forward drive configuration, and shift position 122 may correspond to a high-speed forward drive configuration. A biasing mechanism (not shown) may be provided that urges the shifter handle 114 towards one of the shift positions, such as shift position 118. If the shifter handle is in shift position 116 (low-speed reverse), and the child wants to move the shifter handle 114 to shift position 122 (high-speed forward), the child must overcome the bias conferred upon the shifter handle by the biasing mechanism as the child shifts from shift position 118 to shift position 120. The overall amount of time required for the child to move the shifter handle to shift position 122 is thus increased, and potential for damage to the drive assembly is reduced. It is within the scope of the present disclosure that the biasing mechanism (when present) may be configured to urge the shifter handle to any of the shift positions, or alternatively, to an intermediate position between two of the shift positions.

As schematically illustrated in FIG. 5, actuator assembly 112 may (but is not required in all embodiments to) further include a restraining mechanism 170 that is adapted to be selectively engaged in a manner that prevents the shifter handle from being moved to at least a selected one of the shift positions. Restraining mechanism 170 is adapted to restrict the actuator assembly from being configured to at least one of its drive configurations, such as by blocking or otherwise restricting movement of the shifter handle to at least one of the shift positions and/or movement of the actuator to at least one of its defined positions in which it would otherwise engage the switch assembly to enable a different velocity configuration. For example, the restraining mechanism may include a restraining member that selectively obstructs a shift path for the shifter handle and/or access to a switch (or contact) of the switch assembly to prevent the drive assembly from being configured to a particular drive configuration. As an illustrative example, when switch assembly 106 includes at least a speed switch 108 and a direction switch 110, the restraining mechanism may be selectively engaged to restrict movement to a drive configuration that otherwise is able to be selected and enabled by a child via manual inputs to the shifter handle. Illustrative, non-exclusive examples of these drive configurations include (but are not limited to) a reverse drive configuration and/or a high speed drive configuration. Restraining mechanism 170 is a releasable, or selectively engageable mechanism so that the ride-on may be driven in the restricted drive configuration upon release, or disengagement, of the restraining mechanism. In some embodiments, restraining mechanism 170 is configured to require a tool to release the restraining mechanism once it is engaged and/or to require access by a user to a portion of the ride-on that is not accessible during driving operation of the ride-on in order to release the restraining mechanism once it is engaged.

Figure 10:
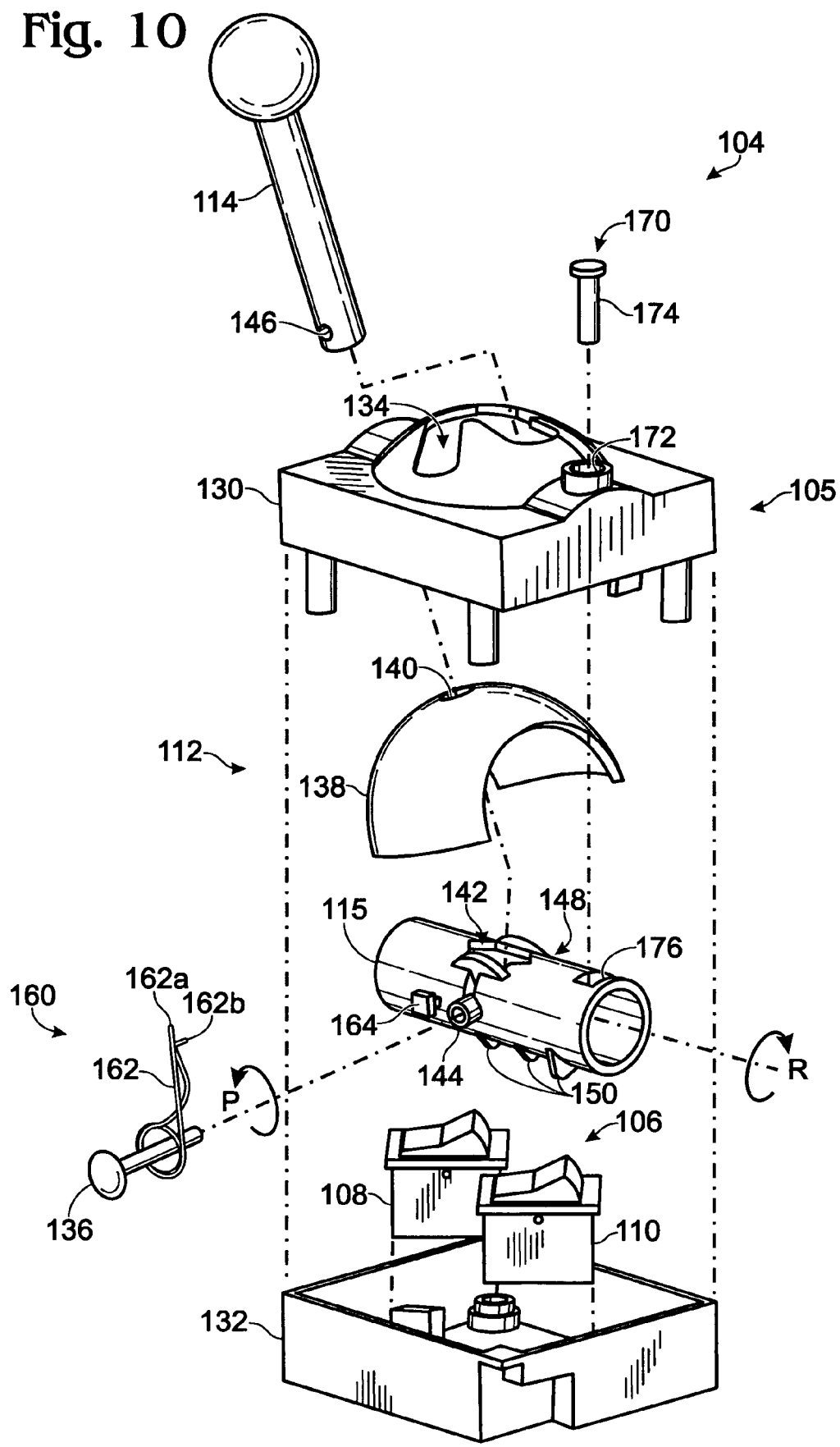
FIG. 10 is an exploded isometric view of an illustrative velocity control assembly according to the present disclosure.

FIGS. 10-15 show an illustrative, non-exclusive example of a velocity control assembly 104 according to the present disclosure. As shown in FIG. 10, the illustrative velocity control assembly 104 includes a housing assembly 105, a switch assembly 106, and an actuator assembly 112.

Housing assembly 105 is shown in FIGS. 10-15, and may include a top member 130 and a bottom member 132. As illustrated, top member 130 includes a slot 134 through which shifter handle 114 passes when the velocity control assembly 104 is assembled. Slot 134 thus forms a guide that defines the plurality of shift positions and the plurality of shift paths. The shift paths shown in FIG. 10 are substantially the same as those shown in FIG. 9, and discussed above. Housing 105 thus in part forms a guide assembly adapted to guide the movement of the shifter handle. Bottom member 132 is configured to engageably mate with top member 130, thereby forming a space that houses and/or maintains the various other components of the vehicle control assembly 104, as described below. It is within the scope of the present disclosure that housing 105 may be otherwise constructed and is not required in all embodiments to have top and bottom members 130 and 132.

Switch assembly 106, shown in FIGS. 10-15, includes a speed switch 108 and a direction switch 110. Speed and direction switches 108 and 110 are shown as rocker switches that rotate about rotational axes between a plurality of settings, although any suitable type of switch may be used. Speed switch 108 is at least movable between a low-speed setting and a high-speed setting, while direction switch 110 is movable between a reverse setting and a forward setting. Speed and direction switches 108 and 110 fit within the housing's bottom member adjacent to actuator 115. As described in more detail below, actuator 115 is configured to selectively engage speed switch 108 and direction switch 110, thereby configuring the switch assembly between a low-speed reverse velocity setting (shown in FIG. 11), a low-speed forward velocity setting (shown in FIGS. 12-13), and a high-speed forward setting (shown in FIG. 14).

Actuator assembly 112, shown in FIGS. 10-12 and 14, includes a shifter handle 114, an actuator 115, a pivot pin 136, and an optional slot cover 138. As shown in FIG. 10, shifter handle 114 fits through slot 134 in the housing's top member 130, through a hole 140 in the slot cover 138, and through a slot 142 in actuator 115. The pivot pin 136 passes through a hole 144 on one side of the actuator, through a pivot hole 146 in shifter handle 114, and through another hole 146 on the other side of actuator 115, such that shifter handle 114 is pivotally attached to actuator 115 about pivot axis P. As best shown in FIGS. 11-14, actuator 115 may be a cylindrical or other tubular member that is sandwiched between the housing's top member 130 and bottom member 132, and is freely rotatable about rotational axis R.

When the velocity control assembly 104 shown in FIGS. 10-15 is fully assembled, some, but not all, movement of shifter handle 114 causes rotational movement of actuator 115. For example, if slot 134 were shaped to permit a user to move shifter handle 114 through a shift path defining a plane perpendicular to the axis of rotation R, the movement would cause actuator 115 to rotate about the axis of rotation R through a distance directly proportional to the distance shifter handle 114 is moved. In contrast, moving shifter handle 114 through a shift path defining a plane that is parallel to the axis of rotation R causes shifter handle 114 to pivot within slot 142 about pivot axis P without rotating or otherwise moving actuator 115. It should be appreciated that moving shifter handle 114 through a shift path defining a plane that is neither perpendicular nor parallel to the axis of rotation R both causes actuator 115 to rotate about the rotational axis R, and causes to shifter handle 114 to pivot about the pivot axis P.

At least some of the shifter handle's movements cause actuator 115 to move between a plurality of actuator positions. For example, moving shifter handle 114 from one shift position to another shift position along a shift path defining any plane that is not parallel to the axis of rotation R causes actuator 115 to rotate from one actuator position to another actuator position. In contrast, moving shifter handle 114 from one shift position to a another shift position along a shift path defining a plane that is parallel to the axis of rotation R causes the shifter handle to pivot about pivot axis P without moving the actuator between actuator positions. This relative movement is described in more detail below.

As shown in FIGS. 10-15, actuator 115 may include cams 150, (which additionally or alternatively may be referred to as nubs, protruding members, or engaging members) that are positioned and shaped to selectively engage portions of the switch assembly as the actuator is rotated about rotational axis R in response to some movement of shifter handle 114. Movement of shifter handle 114 is thus selectively translated through actuator 115 to switch assembly 106, which is configured to be in a particular velocity setting. As described above, each velocity setting of the velocity control assembly in turn configures drive assembly 30 to be in a particular drive configuration.

FIG. 11 shows shifter handle 114 in a first shift position, which corresponds to a low-speed reverse drive configuration. Speed switch 108 is set to the low-speed setting, and direction switch 110 is set to the reverse setting.

FIG. 12 shows shifter handle 114 in a second shift position, which corresponds to a low-speed forward drive configuration. A comparison of FIGS. 11 and 12 shows that moving shifter handle 114 from the first shift position (FIG. 11) through a first shift path to the second shift position (FIG. 12) causes actuator 115 to rotate about its rotational axis R, whereby cams 150 engage direction switch 110 and move direction switch 110 from the reverse setting (FIG. 11) to the forward setting (FIG. 12). The same comparison also shows that moving shifter handle 114 from the first shift position to the second shift position does not cause cams 150 to engage speed switch 108, which thus remains in the low-speed setting.

FIG. 13 shows shifter handle 114 in a third shift position, also corresponding to a low-speed forward drive configuration. A comparison of FIGS. 12 and 13 shows that moving shifter handle 114 from the second shift position (FIG. 12) through a second shift path to the third shift position (FIG. 13) causes shifter handle 114 to move through a plane parallel to the rotational axis R of the actuator. Thus, shifter handle 114 pivots about the pivot axis P without rotating actuator 115, as described above. Because moving shifter handle 114 from the second position to the third position does not rotate actuator 115, the cams 150 also do not move in a manner that causes them to engage either speed switch 108 or direction switch 110. Therefore, speed switch 108 remains in the low-speed setting, and direction switch 110 remains in the forward setting.

FIG. 14 shows shifter handle 114 in a fourth shift position, which corresponds to a high-speed forward drive configuration. A comparison of FIGS. 13 and 14 shows that moving shifter handle 114 from the third shift position (FIG. 13) through a third shift path to the fourth shift position (FIG. 14) causes the actuator to rotate about its rotational axis R, whereby cams 150 engage speed switch 108 and move speed switch 108 from the low-speed setting (FIG. 13) to the high-speed setting (FIG. 14). The same comparison also shows that moving shifter handle 114 from the third shift position to the fourth shift position does not cause cams 150 to engage direction switch 110, which thus remains in the forward setting.

As indicated above, slot 134 in top member 130 functions as a guide for shifter handle 114, and may thus be considered a portion of actuator assembly 112. As shown in FIGS. 10-14, slot 134 may define an "aggravated" shift path that reduces the potential for damage to the drive assembly, such as responsive to rapid reconfiguring of the drive assembly between a low-speed reverse drive configuration and a high-speed forward drive configuration.

As shown in FIGS. 10-15, slot cover 138 has a size and shape that complements the inside portion of the housing's top member 130. When velocity control assembly 104 is fully assembled, slot cover 138 is secured to shifter handle 114 in a position abutting the complementary portion of the housing's top member 130. The slot cover functions to form a barrier below slot 134 regardless of the position of shifter handle 114. When present, slot cover 138 thus prevents foreign objects from entering the inside of velocity control assembly 104 through slot 134.

Figure 15:
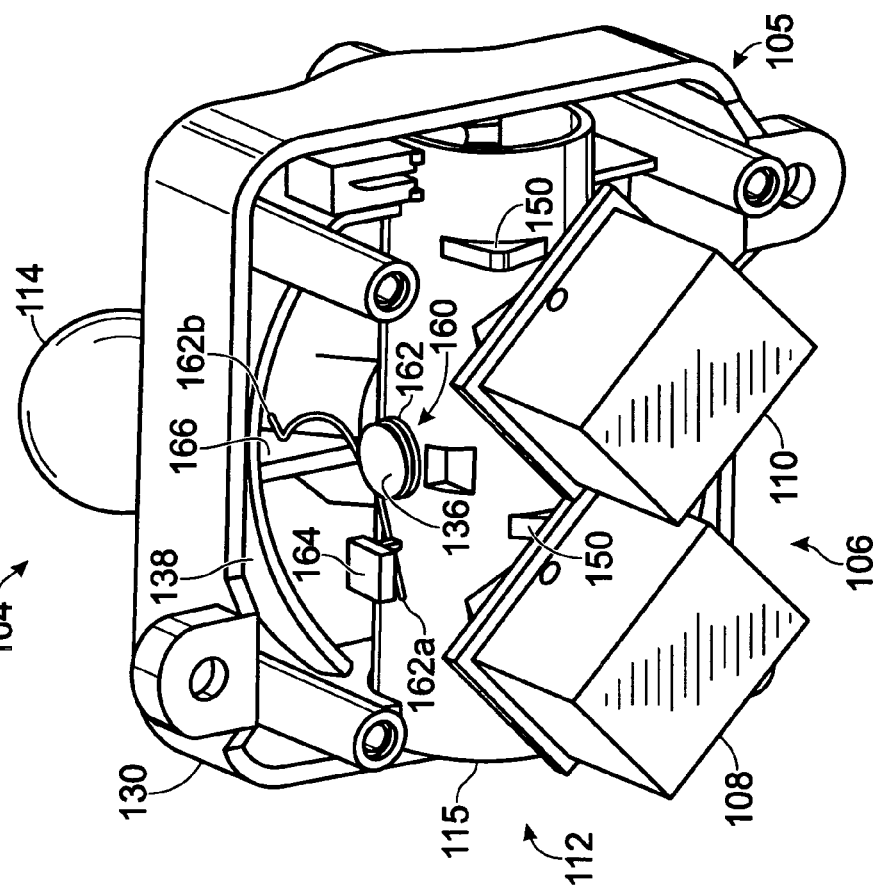
FIG. 15 is an isometric view of the bottom of the velocity control assembly from FIG. 10.

As shown in FIG. 15, the actuator assembly 112 associated with the illustrative velocity control assembly 104 provides an illustrative, non-exclusive example of an actuator assembly that includes a biasing mechanism 160. The illustrated biasing mechanism 160 is adapted to urge shifter handle 114 towards the second shift position (shown in FIG. 12). In FIG. 15, biasing mechanism 160 takes the illustrative, non-exclusive form of a torsion spring 162 dimensioned to be coupled with actuator 115 by pivot pin 136, and having a first end 162a and a second end 162b. First end 162a abuts a stop 164 on actuator 115, while second end 162b torsionally abuts an opposing wall 166 within the slot cover. The torsion spring thus applies a biasing force B against opposing wall 166 that urges shifter handle 114 towards the second shift position (shown in FIG. 12). As described above, biasing mechanism 160 requires a child wanting to move shifter handle 114 from the second position (shown in FIG. 12) to the third position (shown in FIG. 13) to exert sufficient force upon shifter handle 114 to overcome the bias imparted on the shifter handle by the biasing mechanism. As with the "aggravated" shift path, biasing mechanism 160 thus increases the time required for a child to move shifter handle 114 between shift positions corresponding to the low-speed reverse drive configuration (shown in FIG. 11) and the high-speed forward drive configuration (shown in FIG. 14).

As shown in FIGS. 10-14, the actuator assembly 112 associated with the illustrative velocity control assembly 104 further includes a restraining mechanism 170 adapted to be selectively engaged in a manner that prevents shifter handle 114 from being moved to the fourth position (shown in FIG. 14). Restraining mechanism 170 includes a hole or other suitable socket or receiver, 172 in housing 105 for receiving a restraining member 174, such as a screw, bolt, pin, etc. Restraining mechanism 170 is selectively engaged by inserting restraining member 174 into hole 172, whereby stopping member 174 fits within a slot 176 in actuator 115 (which is perhaps best shown in FIGS. 12 and 13). When restraining member 174 is engaged with actuator 115, shifter handle 114 may be freely moved between the first shift position (shown in FIG. 11), the second shift position (shown in FIG. 12), and the third shift position (shown in FIG. 13), because restraining member 174 freely moves within slot 176 and does not restrain the rotational motion of actuator 115. However, when restraining mechanism 170 is engaged, actuator 114 will not freely rotate to a position that corresponds to the shifter handle 115 being moved into the fourth position (as shown in FIG. 4), because restraining member 174 engages the end of slot 176, and prevents this rotation. By preventing the actuator from rotating in this manner, the restraining member 174 in turn prevents shifter handle 115 from rotating to the fourth position.

Figure 16:
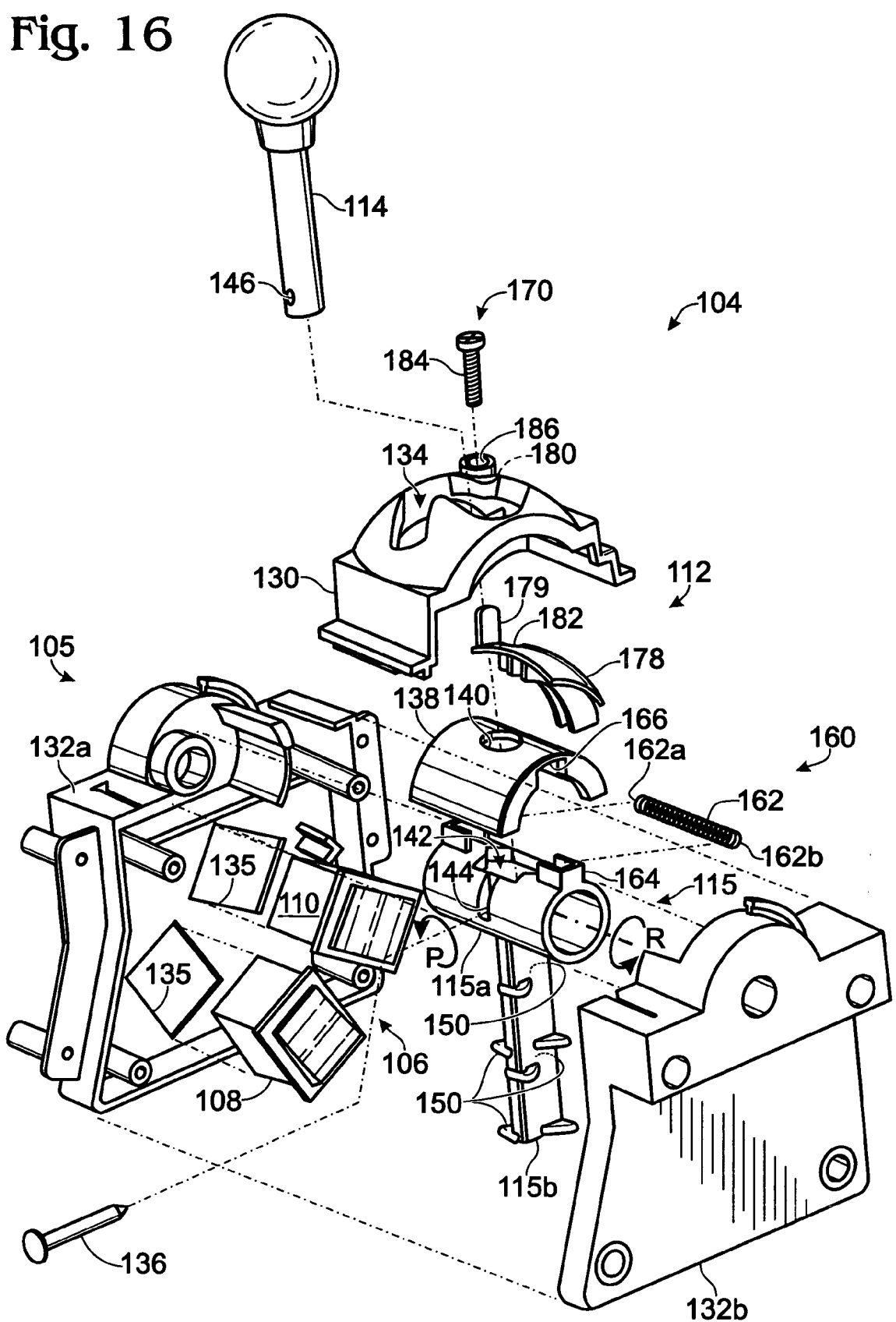
FIG. 16 is an exploded isometric view of another illustrative velocity control assembly according to the present disclosure.

FIGS. 16-23 show another illustrative, non-exclusive example of a velocity control assembly 104 according to the present disclosure. As shown in FIG. 16, the illustrative velocity control assembly 104 includes a housing assembly 105, a switch assembly 106, and an actuator assembly 114.

Housing assembly 105, shown in FIGS. 16-23, includes a top member 130 and a pair of bottom members 132a and 132b. The top member 130 includes a slot 134 through which shifter handle 114 passes when velocity control assembly 104 is assembled. Slot 134 thus forms a guide that defines the plurality of shift positions and the plurality of shift paths, as described below. The shift paths shown in FIG. 16 are substantially the same as those shown in FIGS. 9-15. Housing 105 thus in part forms a guide assembly adapted to guide the movement of the shifter handle. Bottom members 132a and 132b are configured to engageably mate with each other in a manner that houses and/or maintains the various other components of the vehicle control assembly 104, as described below.

Switch assembly 106, such as shown in FIGS. 16-20, includes a speed switch 108 and a direction switch 110. Speed and direction switches 108 and 110 are rocker switches that rotate about rotational axes between a plurality of settings, although any suitable type of switch may be used. Speed switch 108 is at least movable between a low-speed setting and a high-speed setting, while the direction switch 110 is movable between a reverse setting and a forward setting. Speed and direction switches 108 and 110 fit within holes 135 in the housing's bottom member adjacent to actuator 115. As described in more detail herein, actuator 115 is configured to selectively engage speed switch 108 and direction switch 110, thereby configuring switch assembly 106 between a low-speed reverse velocity setting (shown in FIG. 17), a low-speed forward velocity setting (shown in FIGS. 18-19), and a high-speed forward setting (shown in FIG. 20).

Actuator assembly 112, such as shown in FIGS. 16-20, includes a shifter handle 114, an actuator 115, a pivot pin 136, and an optional slot cover 138. As shown in FIG. 10, shifter handle 114 fits through slot 134 in the housing's top member 130, through a hole 140 in slot cover 138, and through a slot 142 in actuator 115. Pivot pin 136 passes through a hole 144 on one side of actuator 115, through a pivot hole 146 in shifter handle 114, and through another hole 146 on the other side of actuator 115, such that shifter handle 114 is pivotally attached to actuator 115 about pivot axis P. The illustrative actuator 115 shown in FIG. 16 includes a cylindrical portion 115a and an arm 115b that extends away from cylindrical portion 115a in a direction opposite, or generally opposed, to the direction of shifter handle 114 when shifter handle 114 is attached to actuator 115. As perhaps best shown in FIGS. 17-20, cylindrical portion 115a is sandwiched between the housing's bottom members 132a and 132b, and is freely rotatable about rotational axis R.

When the velocity control assembly 104 shown in FIGS. 16-23 is fully assembled, some, but not all, movement of shifter handle 114 causes rotational movement of actuator 115. For example, if slot 134 were shaped to permit a user to move shifter handle 114 through a plane perpendicular to the axis of rotation R, the movement would cause actuator 115 to rotate about the axis of rotation R through a distance directly proportional to the distance shifter handle 114 is moved. In contrast, moving shifter handle 114 through a plane that is parallel to the axis of rotation R causes shifter handle 114 to pivot within slot 142 about pivot axis P without rotating or otherwise moving actuator 115. It should be appreciated that moving shifter handle 114 through a plane that is neither perpendicular nor parallel to the axis of rotation R both causes actuator 115 to rotate about the rotational axis R, and causes shifter handle 114 to pivot about the pivot axis P.

As shown in FIGS. 16-20, the actuator's arm 115b may include cams 150, (which additionally or alternatively may be referred to as nubs, protruding members, or engaging members) that are positioned and shaped to selectively engage portions of switch assembly 106 as actuator 115 is rotated about rotational axis R in response to movement of shifter handle 114. Movement of shifter handle 114 is thus selectively translated through actuator 115 to switch assembly 106, which is thereby configured to be in a particular velocity setting. As described above, each velocity setting of the velocity control assembly in turn configures the drive assembly to be in a particular drive configuration.

Figure 17:
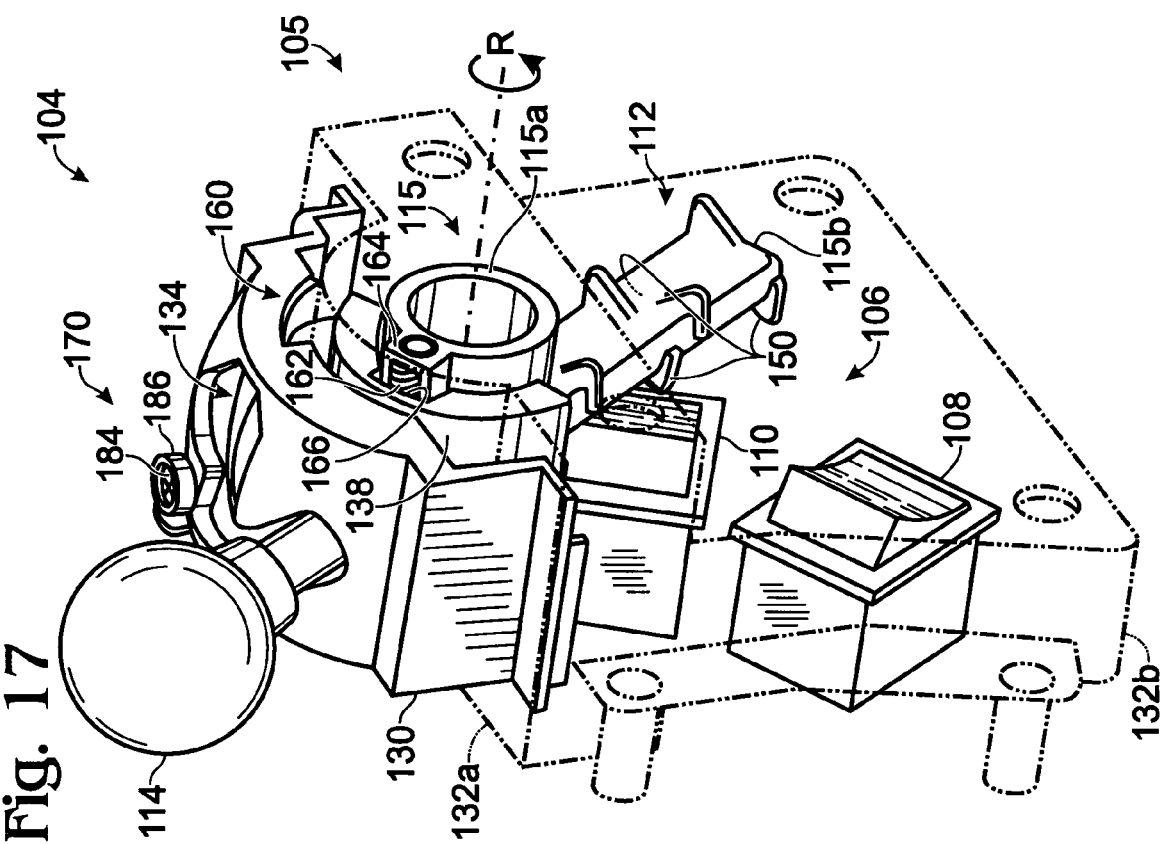
FIG. 17 is an isometric view of the velocity control assembly from FIG. 16, with the shifter handle in a first position and portions of the velocity control assembly shown in phantom.

FIG. 17 shows shifter handle 114 in a first shift position, which corresponds to a low-speed reverse drive configuration. Speed switch 108 is set to the low-speed setting, and direction switch 110 is set to the reverse setting.

Figure 18:
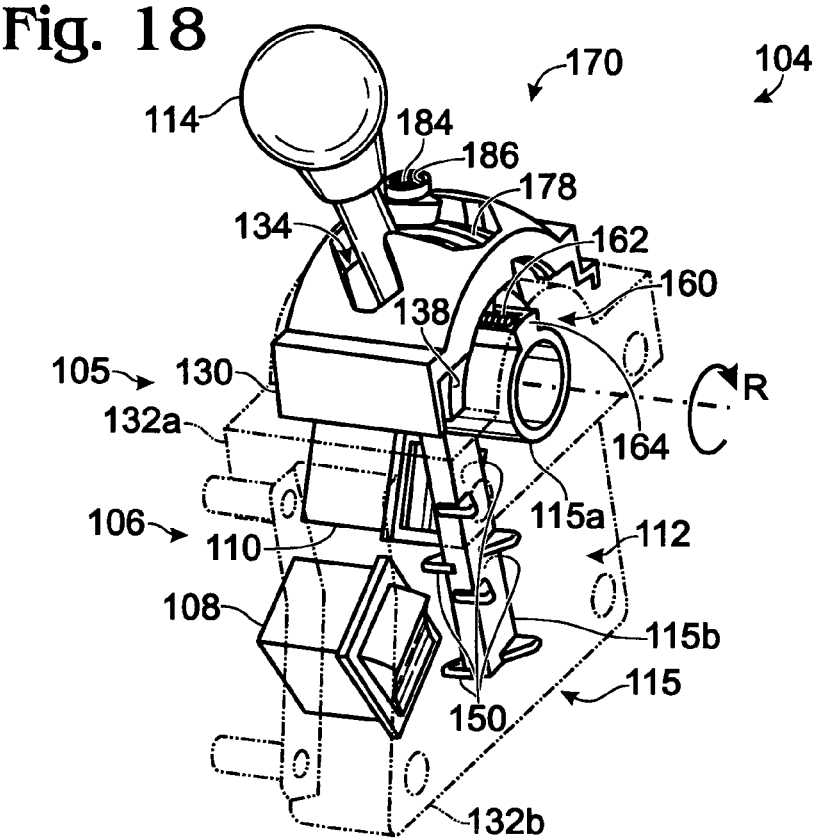
FIG. 18 is an isometric view of the velocity control assembly from FIG. 16, with the shifter handle in a second position and portions of the velocity control assembly shown in phantom.

FIG. 18 shows shifter handle 114 in a second shift position, which corresponds to a low-speed forward drive configuration. A comparison of FIGS. 17 and 18 shows that moving shifter handle 114 from the first shift position (FIG. 17) through a first shift path to the second shift position (FIG. 18) causes actuator 115 to rotate about its rotational axis R, whereby cams 150 engage direction switch 110 and move direction switch 110 from the reverse setting (FIG. 17) to the forward setting (FIG. 18). The same comparison also shows that moving shifter handle 114 from the first shift position to the second shift position does not cause cams 150 to engage speed switch 108, which thus remains in the low-speed setting.

Figure 19:
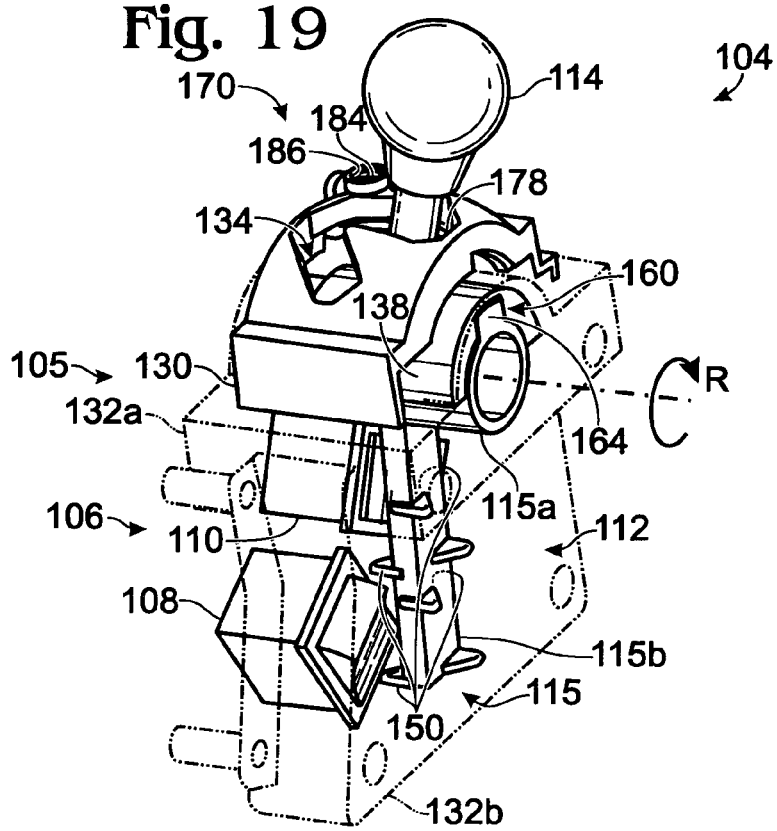
FIG. 19 is an isometric view of the velocity control assembly from FIG. 16, with the shifter handle in a third position and portions of the velocity control assembly shown in phantom.

FIG. 19 shows shifter handle 114 in a third shift position, also corresponding to a low-speed forward drive configuration. A comparison of FIGS. 18 and 19 shows that moving shifter handle 114 from the second shift position (FIG. 18) through a second shift path to the third shift position (FIG. 19) causes shifter handle 114 to move through a plane parallel to the rotational axis R of actuator 115. Thus, shifter handle 114 pivots about the pivot axis P without rotating actuator 115, as described above. Because moving shifter handle 114 from the second position to the third position does not rotate actuator 115, cams 150 also do not move in a manner that causes them to engage either speed switch 108 or direction switch 110. Therefore, speed switch 108 remains in the low-speed setting, and direction switch 110 remains in the forward setting.

Figure 20:
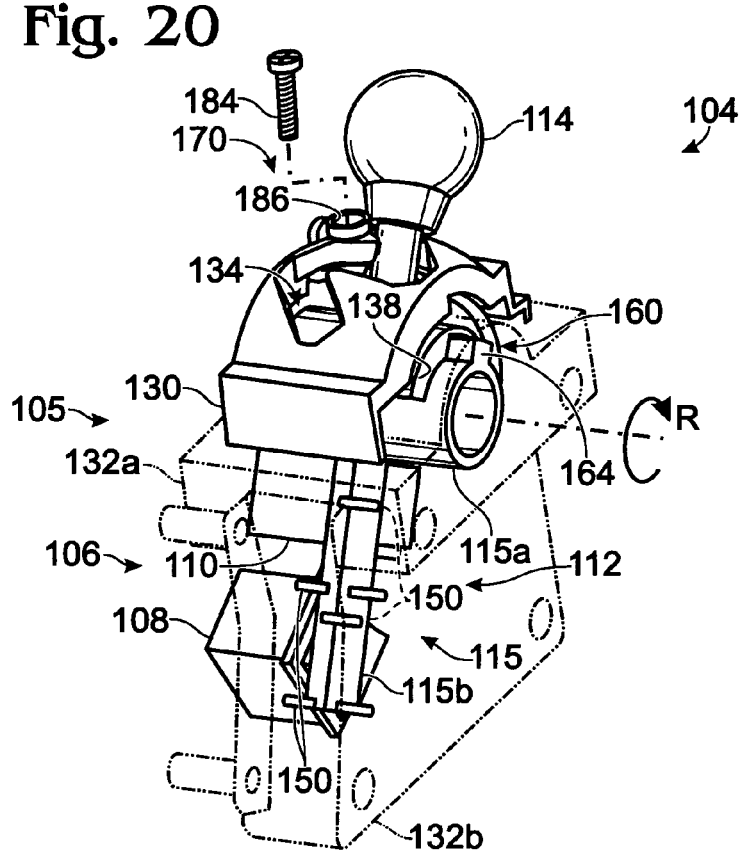
FIG. 20 is an isometric view of the velocity control assembly from FIG. 16, with the shifter handle in a fourth position and portions of the velocity control assembly shown in phantom.

FIG. 20 shows shifter handle 114 in a fourth shift position, which corresponds to a high-speed forward drive configuration. A comparison of FIGS. 19 and 20 shows that moving shifter handle 114 from the third shift position (FIG. 19) through a third shift path to the fourth shift position (FIG. 20) causes the actuator to rotate about its rotational axis R, whereby the cams 150 engage the speed switch 108 and move the speed switch 108 from the low-speed setting (FIG. 13) to the high-speed setting (FIG. 14). The same comparison also shows that moving shifter handle 114 from the third shift position to the fourth shift position does not cause cams 150 to engage direction switch 110, which thus remains in the forward setting.

As indicated above, slot 134 in top member 130 functions as a guide for shifter handle 114, and may thus be considered a portion of actuator assembly 112. As shown in FIGS. 17-20, slot 134 may define an "aggravated" shift path that reduces the potential damage to the drive assembly, such as responsive to rapid reconfiguring of drive assembly 30 between a low-speed reverse drive configuration and a high-speed forward drive configuration.

As shown in FIGS. 16-21, the slot cover 138 has a size and shape that complements the inside portion of the housing's top member 130. When velocity control assembly 104 is fully assembled, slot cover 138 is secured to shifter handle 114 in a position abutting the complementary portion of the housing's top member 130. The slot cover functions to form a barrier below slot 134 regardless of the position of the shifter handle 114. When present, the slot cover thus prevents foreign objects from entering the inside of the velocity control assembly 104 through the slot 134.

As best shown in FIGS. 16 and 18-19, the actuator assembly 112 associated with the illustrative velocity control assembly 104 further includes a biasing mechanism 160 that urges the shifter handle towards the second shift position (shown in FIG. 18). In the illustrative example shown in FIG. 18, biasing mechanism 160 includes a compression spring 162 having a first end 162a and a second end 162b (as indicated in FIG. 16). First end 162a abuts a stop 164 on actuator 115, while second end 162b abuts an opposing wall 166 within slot cover 138. The compression spring thus applies a biasing force B against the opposing wall 166 that urges the slot cover 138, and therefore also urges shifter handle 114 towards the second shift position (shown in FIG. 18). As described above, the biasing mechanism requires a child wanting to move the shifter handle 114 from the second position (shown in FIG. 18) to the third position (shown in FIG. 19) to exert sufficient force upon the shifter handle 114 to overcome the bias imparted on shifter handle 114 by biasing mechanism 160. As with the "aggravated" shift path, biasing mechanism 160 thus increases the time required for a child to move shifter handle 114 between shift positions corresponding to the low-speed reverse drive configuration (shown in FIG. 17) and the high-speed forward drive configuration (shown in FIG. 20).

Figure 21:
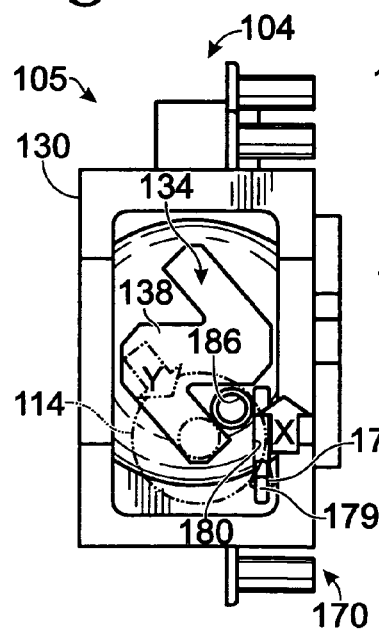
FIG. 21 is a top plan view of the velocity control assembly from FIG. 16, showing the high speed lockout mechanism engaged and portions of the velocity control assembly shown in phantom.
Figure 22:
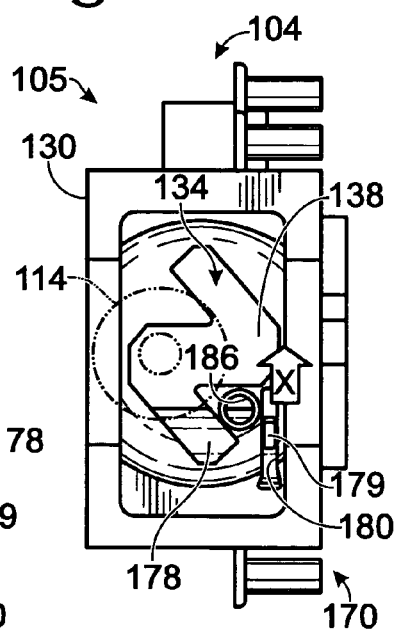
FIG. 22 is a top plan view of the velocity control assembly from FIG. 16, showing the high speed lockout mechanism partially disengaged and portions of the velocity control assembly shown in phantom.
Figure 23:
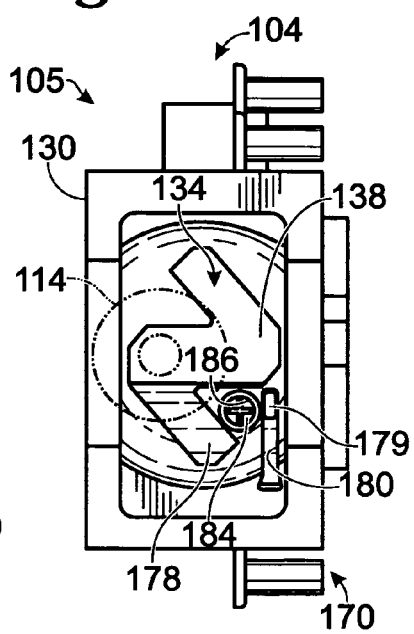
FIG. 23 is a top plan view of the velocity control assembly from FIG. 16, showing the high speed lockout mechanism disengaged and portions of the velocity control assembly shown in phantom.

As shown in FIGS. 16 and 21-23, the actuator assembly 112 associated with the illustrative velocity control assembly 104 further includes a restraining mechanism 170 adapted to be selectively engaged in a manner that prevents shifter handle 114 from being moved to the fourth position (shown in FIG. 21). Restraining mechanism 170 includes a restraining member 178 dimensioned to fit between slot cover 138 and the housing's top member 130. Restraining member 178 includes a tab 179 that fits through a slot 180 in the housing's top member 130, and provides a gripping surface for a user to move restraining member 178 within housing 105. As indicated in FIG. 16, restraining member 178 may include a hole 182 for receiving a securing member 184, as described below. As is perhaps best shown in FIGS. 21-23, restraining member 178 can be moved from a non-restraining position (shown in FIG. 21) through an intermediate position (shown in FIG. 22) to a restraining position (shown in FIG. 23) by moving tab 179 within slot 180 along direction X. Restraining mechanism 170 also includes a hole 186 in the housing's top member 130 for receiving a securing member 184, such as a screw, bolt, pin, etc.

When the restraining member 178 is in the restraining position (shown in FIG. 23), securing member 184 may be inserted through hole 186 in the housing's top member 130, and through hole 182 in restraining member 178, whereupon restraining member 178 is secured in the restraining position. Restraining mechanism 170 is thus engaged, as restraining member 178 forms a physical barrier that prevents shifter handle 114 from being moved from the third position to the fourth position. To disengage the restraining mechanism, a user must remove securing member 184 from hole 186, whereupon the restraining member 170 may be moved into the non-restraining position, either by moving the tab 179 within slot 180 in the opposite of direction X, or by moving shifter handle 114 from the third position to the fourth position, as shown by arrow Y. In FIGS. 10-15 and 16-23, two illustrative, non-exclusive examples of velocity control assemblies 104 according to the present disclosure have been presented in detail. It is within the scope of the present disclosure that the velocity control assemblies may be otherwise implemented, such as discussed and/or illustrated with respect to one or more of FIGS. 5-9. For example, the switch assembly may include more than two switches, the switches may take forms other than two-position rocker switches (including contact switches that are engaged by one or more corresponding contacts or bridges on the actuator assembly), the actuator assembly may define differently oriented shift paths and/or a different number of shift positions (including fewer or more positions), than illustrated with respect to FIGS. 10-23, and/or the switches may be embodied to be switches other than a pair of speed and direction switches. In some embodiments that include a restraining mechanism, the selectively restricted position may be a reverse drive configuration, while in others it may be a high (or comparably higher) speed configuration. In some embodiments, the actuator assembly may define three shift positions, while in others it may define 4, 5, or more shift positions. In some embodiments, at least two of the shift paths may extend at non-linear orientations relative to each other, such as at angles of less than 180°, with additional illustrative examples including angles of 30-150°, angles of 45-135°, angles of 60-120°, and/or angles of approximately 90°. In some embodiments that include at least three shift paths, at least three of the shift paths extend at non-linear relative orientations. In embodiments that include a biasing mechanism, any suitable biasing member, or combination of members, may be used, with illustrative examples including springs (such as extension, torsion, leaf, compression, etc.), resilient members, and elastic members.

Referring again to FIGS. 2 and 3, another illustrative example of a suitable user input device 102 includes a drive actuator 190, which receives user input(s) that selectively direct the drive assembly to operate in a selected drive configuration, such as by directing the battery assembly to energize the motor assembly. Examples of suitable drive actuators 190 include an on/off switch, a foot pedal, a throttle lever, and a rotational handgrip on a steering mechanism that includes a handlebar. In FIG. 2, an example of a drive actuator 190 is shown in the form of a foot pedal 192 positioned to be selectively engaged by a child sitting on seat 18. When drive actuator 190 takes a form other than a foot pedal, it may be located in any suitable location within or near passenger compartment 14 so that a child sitting on seat 18 may reach the actuator while positioned to operate the vehicle. For example, an on/off switch or throttle may be located on the body or on the steering mechanism, such as illustrated at 194 in FIG. 2.

As indicated in FIG. 3, drive assembly 30 may (but is not required to) further include a controller 196, which is adapted to control electronically the transmission of the rotational input from the motor assembly to the driven wheel assembly. More specifically, controller 196 includes a microprocessor or suitable control circuit that is adapted to control the actuation, or energization, of the motor assembly by the battery assembly to regulate electronically the rotational input transmitted by the motor assembly to the driven wheel assembly. Controller 196 may regulate at least one of the timing and the ramp, or rate, of application of the transmission of the rotational input after actuation of a corresponding user input device by a child sitting on seat 18. In other words, the controller delays in at least time and/or rate of transmission the rotational input to the driven wheel assembly responsive at least in part to a user input selecting the desired, or selected, rotational input. For example, the controller may be adapted to control the energization of the ride-on's motor assembly by the battery assembly through microprocessor-based duty cycle ramping and/or pulse width modulation. Illustrative, non-exclusive examples of suitable controllers are disclosed in U.S. Pat. No. 6,771,034, the complete disclosure of which is hereby incorporated by reference for all purposes.

INDUSTRIAL APPLICABILITY

The present disclosure is applicable to children's ride-on vehicles with battery-powered motor assemblies.

It is believed that the disclosure set forth herein encompasses multiple distinct inventions with independent utility.

While each of these inventions has been disclosed in its preferred form, the specific embodiments thereof as disclosed and illustrated herein are not to be considered in a limiting sense as numerous variations are possible. The subject matter of the disclosure includes all novel and non-obvious combinations and subcombinations of the various elements, features, functions and/or properties disclosed herein. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to one of the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower or equal in scope to the original claims, are also regarded as included within the subject matter of the inventions of the present disclosure.

What is claimed is:

1. A children's ride-on vehicle, comprising:
   a body having at least one seat sized for a child;
   a plurality of wheels rotatably coupled to the body, wherein the plurality of wheels includes at least one driven wheel and at least one steerable wheel;
   a steering assembly comprising a steering mechanism adapted to receive steering inputs from a child sitting on the at least one seat, and a steering linkage adapted to convey the steering inputs to the at least one steerable wheel;
   a drive assembly, comprising:
      a motor assembly including at least one electric motor adapted to selectively drive the rotation of the at least one driven wheel;
      a battery assembly adapted to selectively energize the motor assembly, and
      a velocity control assembly adapted to selectively configure the drive assembly to be in a plurality of drive configurations, the velocity control assembly comprising:
         a switch assembly including at least one switch, wherein the switch assembly is adapted to be selectively configured between a plurality of velocity settings, and wherein each velocity setting in turn configures the drive assembly to be in a predetermined drive configuration;
         an actuator assembly adapted to receive user inputs from the child sitting on the at least one seat, wherein the actuator assembly includes:
            a shifter handle adapted to be selectively moved by the child between a plurality of shift positions along a plurality of shift paths, including between a first shift position and a second shift position along a first shift path, and a second shift position and a third shift position along a second shift path, wherein the first shift path is not co-linear with the second shift path; and
            a biasing mechanism that urges the shifter handle towards a selected one of the shift positions; and
         wherein the actuator assembly includes an actuator operatively coupled to the shifter handle, and less than all movements of the shifter handle cause movement of the actuator, and wherein the actuator configures the switch assembly to be in a first velocity setting when the shifter handle is in the first shift position, a second velocity setting when the shifter handle is in the second shift position, and a third velocity setting when the shifter handle is in the third shift position.

2. The children's ride-on vehicle of claim 1, further comprising a drive actuator adapted to be selectively engaged by a child sitting on the at least one seat, wherein engagement of the drive actuator causes the drive assembly to operate in the drive configuration that is predetermined by the selected velocity setting.

3. The children's ride-on vehicle of claim 1, wherein the velocity control assembly further includes a disengageable restraining mechanism that prevents the shifter handle from moving from the second shift position to the third shift position when the restraining mechanism is engaged.

4. The children's ride-on vehicle of claim 1, wherein the actuator assembly further comprises a guide assembly adapted to guide the movement of the shifter handle between the plurality of shift positions along the plurality of shift paths.

5. The children's ride-on vehicle of claim 4, wherein each of the plurality of shift paths are at least substantially linear.

6. The children's ride-on vehicle of claim 1, wherein the first and second shift paths are oriented to restrict rapid reconfiguring of the actuator assembly between at least the first and the third shift positions.

7. The children's ride-on vehicle of claim 1, wherein the actuator is adapted to be selectively rotated by the shifter handle about a rotational axis, and wherein at least some rotational movement by the actuator causes the actuator to selectively engage at least a portion of the switch assembly in a manner that configures the switch assembly within the plurality of velocity settings.

8. The children's ride-on vehicle of claim 7, wherein the shifter handle is pivotally connected to the actuator along a pivot axis that is substantially perpendicular to the rotational axis of the actuator, and wherein the actuator does not rotate about the rotational axis when the shifter handle is pivoted about the pivot axis.

9. The children's ride-on vehicle of claim 8, wherein the biasing mechanism includes a spring that urges the shifter handle to pivot about the pivot axis.

10. The children's ride-on vehicle of claim 1, wherein the at least one switch includes a rocker switch adapted to be selectively rotated about a rotational axis between a plurality of velocity settings, and wherein at least some movement of the actuator causes the actuator to engage and rotate the rocker switch between a plurality of velocity settings.

11. The children's ride-on vehicle of claim 1, wherein the, switch assembly includes at least one of:
   a direction switch adapted to be selectively configured between a reverse setting and a forward setting; and
   a speed switch adapted to be selectively configured between at least a low-speed setting and a high-speed setting.

12. The children's ride-on vehicle of claim 1, wherein the first velocity setting configures the drive assembly to be in a low-speed reverse drive configuration, the second velocity setting configures the drive assembly to be in a low-speed forward drive configuration, and the third velocity setting configures the drive assembly to be in a high-speed forward drive configuration.

13. The children's ride-on vehicle of claim 1, wherein the actuator assembly is adapted to configure the switch assembly to be in a velocity setting that in turn configures the drive assembly to be in a non-neutral drive configuration, when the shifter handle is positioned in the selected one of the shift positions to which the biasing mechanism urges the shifter handle.

14. The children's ride-on vehicle of claim 1, wherein each of the plurality of velocity settings configures the drive assembly to be in a non-neutral drive configuration.

15. The children's ride-on vehicle of claim 1, wherein the second velocity setting is the same as the third velocity setting.

16. The children's ride-on vehicle of claim 1, wherein the shifter handle is further adapted to be selectively moved between the third shift position and a fourth shift position, along a third shift path, and whereby the actuator assembly configures the switch assembly to be in a fourth velocity setting when the shifter handle is in the fourth shift position.

17. The children's ride-on vehicle of claim 16, wherein the second velocity setting is the same as the third velocity setting.

18. The children's ride-on vehicle of claim 17, wherein the first velocity setting configures the drive assembly to be in a low-speed reverse drive configuration, the second and third velocity settings each configure the drive assembly to be in a low-speed forward drive configuration, and the fourth velocity setting configures the drive assembly to be in a high-speed forward drive configuration.

19. The children's ride-on vehicle of claim 16, wherein the biasing mechanism urges the shifter handle toward a selected one of the second or third shift positions when the shifter handle is in the second shift path.

20. A children's ride-on vehicle, comprising:
a body having at least one seat for a child;
a plurality of wheels rotatably coupled to the body, wherein the plurality of wheels includes at least one driven wheel and at least one steerable wheel;
a steering assembly comprising a steering mechanism adapted to receive steering inputs from a child sitting on the at least one seat, and a steering linkage adapted to convey the steering inputs to the at least one steerable wheel;
a drive assembly, comprising:
  a motor assembly including at least one electric motor adapted to selectively drive the rotation of the at least one driven wheel;
  a battery assembly adapted to selectively energize the motor assembly, and
  a velocity control assembly adapted to selectively configure the drive assembly to be in a plurality of drive configurations, comprising:
    a housing assembly associated with the body;
    a switch assembly coupled to the housing assembly, and including at least one switch, wherein the switch assembly is adapted to be selectively configured between a plurality of velocity settings, and wherein each velocity setting in turn configures the drive assembly to be in a predetermined drive configuration;
    an actuator assembly operatively coupled to the housing assembly, and adapted to receive user inputs from the child sitting on the at least one seat, wherein the actuator assembly includes:
      a shifter handle adapted to be selectively moved by the child between a plurality of shift positions along a plurality of shift paths, including between a first shift position and a second shift position along a first shift path, and a second shift position and a third shift position along a second shift path, wherein the plurality of shift positions and the plurality of shift paths are defined at least in part by the housing assembly, and wherein the first shift path is not co-linear with the second shift path; and
      a restraining mechanism adapted to be selectively engaged in a manner that prevents the shifter handle from being moved to at least a selected one of the shift positions, wherein the actuator assembly includes an actuator operatively coupled to the housing assembly, the shifter handle is operatively coupled to the actuator, and less than all movements of the shifter handle cause the actuator to move between a plurality of actuator positions;
    whereby the actuator configures the switch assembly to be in a first velocity setting when the shifter handle is in the first shift position, a second velocity setting when the shifter handle is in the second shift position, and a third velocity setting when the shifter handle is in the third shift position.

21. The children's ride-on vehicle of claim 20, wherein the housing assembly is coupled to the body.

22. The children's ride-on vehicle of claim 20, further comprising a drive actuator adapted to be selectively engaged by a child sitting on the at least one seat, wherein engagement of the drive actuator causes the drive assembly to operate in the drive configuration that is predetermined by the selected velocity setting.

23. The children's ride-on vehicle of claim 20, wherein engaging the restraining mechanism prevents the shifter handle from being moved from the second shift position to the third shift position.

24. The children's ride-on vehicle of claim 20, wherein the restraining mechanism includes a restraining member, and wherein engaging the restraining mechanism includes disengageably securing the restraining member in a fixed position relative to the housing assembly.

25. The children's ride-on vehicle of claim 24, wherein the restraining member blocks the shifter handle from being moved to at least the selected one of the shift positions when the restraining mechanism is engaged.

26. The children's ride-on vehicle of claim 20, wherein the first and second shift paths are oriented to restrict rapid reconfiguring of the actuator assembly between at least the first and the third shift positions.

27. The children's ride-on vehicle of claim 20, wherein the restraining member is adapted to prevent the actuator from moving to at least a selected one of the actuator positions when the restraining mechanism is engaged, and wherein preventing the actuator from moving to the selected one of the actuator positions in turn prevents the shifter handle from moving to the selected one of the shift positions.

28. The children's ride-on vehicle of claim 20, wherein the actuator is adapted to be selectively rotated by the shifter handle about a rotational axis, and wherein at least some rotational movement by the actuator causes the actuator to selectively engage the at least one switch in a manner that configures the switch between a plurality of velocity settings.

29. The children's ride-on vehicle of claim 28, wherein the shifter handle is pivotally connected to the actuator along a pivot axis that is substantially perpendicular to the rotational axis of the actuator, and wherein the actuator does not rotate when the shifter handle is pivoted about the pivot axis.

30. The children's ride-on vehicle of claim 29, wherein the restraining member is adapted to prevent the actuator from rotating to at least a selected one of the actuator positions when the restraining mechanism is engaged, and wherein preventing the actuator from moving to the selected one of the actuator positions in turn prevents the shifter handle from moving to the selected one of the shift positions.

31. The children's ride-on vehicle of claim 20, wherein the first velocity setting configures the drive assembly to be in a low-speed reverse drive configuration, the second velocity setting configures the drive assembly to be in a low-speed forward drive configuration, and the third velocity setting configures the drive assembly to be in a high-speed forward drive configuration.

32. The children's ride-on vehicle of claim 31, wherein the restraining mechanism prevents the shifter handle from being moved from the second shift position to the third shift position.

33. The children's ride-on vehicle of claim 20, wherein the shifter handle is also adapted to be selectively moved between the third shift position and a fourth shift position along a third shift path, and whereby the actuator assembly configures the switch assembly to be in a fourth velocity setting when the shifter handle is in the fourth shift position.

34. The children's ride-on vehicle of claim 33, wherein the second velocity setting is the same as the third velocity setting.

35. The children's ride-on vehicle of claim 33, wherein the first velocity setting configures the drive assembly to be in a low-speed reverse drive configuration, the second and third velocity settings. each configure the drive assembly to be in a low-speed forward drive configuration, and the fourth velocity setting configures the drive assembly to be in a high-speed forward drive configuration.

36. The children's ride-on vehicle of claim 35, wherein the restraining mechanism prevents the shifter handle from being moved from the third shift position to the fourth shift position.

37. A children's ride-on vehicle, comprising:
 a body having at least one seat sized for a child;
 a plurality of wheels rotatably coupled to the body, wherein the plurality of wheels includes at least one driven wheel and at least one steerable wheel;
 a steering assembly comprising a steering mechanism adapted to receive steering inputs from a child sitting on the at least one seat, and a steering linkage adapted to convey the steering inputs to the at least one steerable wheel;
 a drive assembly, comprising:
  a motor assembly including at least one electric motor adapted to selectively drive the rotation of the at least one driven wheel;
  a battery assembly adapted to selectively energize the motor assembly, and
  a velocity control assembly adapted to selectively configure the drive assembly to be in a plurality of drive configurations, the velocity control assembly comprising:
   a switch assembly including at least one switch, wherein the switch assembly is adapted to be selectively configured between a plurality of velocity settings, and wherein each velocity setting in turn configures the drive assembly to be in a predetermined drive configuration; and
   an actuator assembly adapted to receive user inputs from the child sitting on the at least one seat, wherein the actuator assembly includes a shifter handle adapted to be selectively moved by the child between a plurality of shift positions along a plurality of shift paths, including between a first shift position and a second shift position along a first shift path, and a second shift position and a third shift position along a second shift path, wherein the first shift path is not co-linear with the second shift path,
  wherein the actuator assembly includes an actuator that is adapted to be selectively rotated by the shifter handle about a rotational axis, and the shifter handle is pivotally connected to the actuator along a pivot axis that is different from, and not parallel to, the rotational axis, and wherein at least some movements of the actuator configures the switch assembly within the plurality of velocity settings.

38. The children's ride-on vehicle of claim 37, wherein the pivot axis is at least substantially perpendicular to the rotational axis.

* * * * *

UNITED STATES PATENT AND TRADEMARK OFFICE
CERTIFICATE OF CORRECTION

| | |
|---|---|
| PATENT NO. | : 7,487,850 B2 |
| APPLICATION NO. | : 11/410568 |
| DATED | : February 10, 2009 |
| INVENTOR(S) | : Christopher F. Lucas and John Rhein |

It is certified that error appears in the above-identified patent and that said Letters Patent is hereby corrected as shown below:

Column 17, Line 52, after "from the child" please delete "sifting" and insert -- sitting --.

Signed and Sealed this
Fourth Day of October, 2011

David J. Kappos
*Director of the United States Patent and Trademark Office*